United States Patent
Wu et al.

(10) Patent No.: US 12,260,226 B2
(45) Date of Patent: Mar. 25, 2025

(54) METHOD AND APPARATUS FOR DOWNLOADING APPLICATION WHILE DISPLAYING APPLICATION INTERFACE THEREOF, COMPUTER DEVICE, AND STORAGE MEDIUM

(71) Applicant: TENCENT TECHNOLOGY (SHENZHEN) COMPANY LIMITED, Shenzhen (CN)

(72) Inventors: Haijun Wu, Shenzhen (CN); Wanze Xiong, Shenzhen (CN); Zhiming Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 910 days.

(21) Appl. No.: 17/365,537

(22) Filed: Jul. 1, 2021

(65) Prior Publication Data
US 2021/0326145 A1    Oct. 21, 2021

Related U.S. Application Data

(63) Continuation of application No. PCT/CN2020/090479, filed on May 15, 2020.

(30) Foreign Application Priority Data

May 23, 2019   (CN) .......................... 201910436057.9

(51) Int. Cl.
*G06F 8/61*     (2018.01)
*A63F 13/48*    (2014.01)
(Continued)

(52) U.S. Cl.
CPC .......... *G06F 9/44505* (2013.01); *A63F 13/48* (2014.09); *G06F 3/0482* (2013.01); *G06F 8/61* (2013.01); *G06F 9/451* (2018.02)

(58) Field of Classification Search
None
See application file for complete search history.

(56) References Cited

U.S. PATENT DOCUMENTS 7,887,420 B2 *   2/2011   Nguyen ................ G07F 17/323
                                                          463/16
2017/0286561 A1  10/2017  Bai et al.
(Continued)

FOREIGN PATENT DOCUMENTS

| CN | 103685356 A | 3/2014 |
|----|-------------|--------|
| CN | 105516262 A | 4/2016 |

(Continued)

OTHER PUBLICATIONS

ComputerSluggish; www.youtube.com/watch?v=N2kHW2llqAw; Youtube, Dec. 22, 2017 (Year: 2017).*

(Continued)

*Primary Examiner* — Bing Zhao
(74) *Attorney, Agent, or Firm* — ANOVA LAW GROUP, PLLC

(57) ABSTRACT

A method for starting an application, performed by a terminal, includes: displaying an application startup management interface, the application startup management interface including at least one startup control of at least one application, each application corresponding to one startup control; obtaining a first trigger signal, the first trigger signal being a signal generated upon detecting a trigger operation on a startup control of a target application; obtaining an application video stream when a terminal has not finished downloading a client of the target application, the application video stream being a video stream formed by application screens generated during running of a first client, the first client being a client of the target application run on a server; and displaying a first application interface of the (Continued)

target application according to the application video stream. The server may be a cloud server.

18 Claims, 21 Drawing Sheets

(51) Int. Cl.
*G06F 3/0482* (2013.01)
*G06F 9/445* (2018.01)
*G06F 9/451* (2018.01)

(56) References Cited

U.S. PATENT DOCUMENTS

| | | | |
|---|---|---|---|
| 2018/0249190 A1 | 8/2018 | Wu et al. | |
| 2018/0348967 A1 | 12/2018 | Kondrk et al. | |
| 2018/0357057 A1* | 12/2018 | Chen | G06F 9/45558 |
| 2018/0373792 A1 | 12/2018 | Zhang et al. | |

FOREIGN PATENT DOCUMENTS

| | | | |
|---|---|---|---|
| CN | 105867714 A | | 8/2016 |
| CN | 107045508 A | | 8/2017 |
| CN | 107643930 A | | 1/2018 |
| CN | 107729079 A | | 2/2018 |
| CN | 108170438 A | | 6/2018 |
| CN | 108282698 A | | 7/2018 |
| CN | 103685356 B | * | 8/2018 |
| CN | 108363528 A | | 8/2018 |
| CN | 109144596 A | | 1/2019 |
| CN | 110187889 A | | 8/2019 |

OTHER PUBLICATIONS

The State Intellectual Property Office of the People's Republic of China (SIPO) Office Action 1 for for 201910436057.9 Feb. 3, 2021 12 Pages (including translation).
The World Intellectual Property Organization (WIPO) International Search Report for PCT/CN2020/090479 Aug. 17, 2020 5 Pages (including translation).
Intellectual Property Office of Singapore The Office Action for Application No. 11202107392T Nov. 15, 2022 11 pages.

* cited by examiner

METHOD AND APPARATUS FOR DOWNLOADING APPLICATION WHILE DISPLAYING APPLICATION INTERFACE THEREOF, COMPUTER DEVICE, AND STORAGE MEDIUM

CROSS-REFERENCES TO RELATED APPLICATIONS

This application is a continuation application of PCT Patent Application No. PCT/CN2020/090479, entitled "APPLICATION STARTING METHOD AND APPARATUS, COMPUTER DEVICE AND STORAGE MEDIUM" and filed on May 15, 2020, which claims priority to Chinese patent application No. 201910436057.9, entitled "METHOD AND APPARATUS FOR STARTING APPLICATION, AND STORAGE MEDIUM", filed with the China National Intellectual Property Administration on May 23, 2019, the entire contents of both of which are incorporated herein by reference.

FIELD OF THE TECHNOLOGY

The present disclosure relates to the field of computer technologies, and in particular, to a method and an apparatus for starting an application, a computer device, and a storage medium.

BACKGROUND OF THE DISCLOSURE

With the development of the field of computers, it has become very common for people to use application programs installed in a terminal for entertainment or life. The volume of an installation package of the application program becomes increasingly large due to factors such as the continuous improvement of screen quality of the application program as well as the continuous diversification of methods for running an application program.

In the related art, for an application program that has never been installed by a user, if intending to run the application program, the user often needs to spend much time in downloading an installation package of the application program, and wait for the application program to be installed before using the application program, resulting in a long waiting time for using the application.

SUMMARY

Various embodiments of the present disclosure provide a method and an apparatus for starting an application, a computer device, and a storage medium. The technical solutions are as follows.

According to one aspect, the embodiments of the present disclosure provide a method for starting an application, performed by a terminal, the method including: displaying an application startup management interface, the application startup management interface including at least one startup control of at least one application, each application corresponding to one startup control; obtaining a first trigger signal, the first trigger signal being a signal generated upon detecting a trigger operation on a startup control of a target application, the target application being any one of the at least one application; obtaining an application video stream when the terminal has not finished downloading a client of the target application, the application video stream being a video stream formed by application screens generated during running of a first client, the first client being a client of the target application run on a server; and displaying a first application interface of the target application according to the application video stream.

According to another aspect, the embodiments of the present disclosure provide an apparatus for starting an application, including: a management interface display module, configured to display an application startup management interface, the application startup management interface including at least one startup control of at least one application, each application corresponding to one startup control; a trigger signal obtaining module, configured to obtain a first trigger signal, the first trigger signal being a signal generated upon detecting a trigger operation on a startup control of a target application, the target application being any one of the at least one application; a video stream obtaining module, configured to obtain an application video stream when the terminal has not finished downloading a client of the target application, the application video stream being a video stream formed by application screens generated during running of a first client, the first client being a client of the target application run on a server; and an application interface display module, configured to display a first application interface of the target application according to the application video stream.

According to still another aspect, the embodiments of the present disclosure further provide a computer device, including: a memory and a processor, the memory storing computer-readable instructions, the computer-readable instructions, when executed by the processor, causing the processor to perform a plurality of operations. The plurality of operations include: displaying an application startup management interface, the application startup management interface including at least one startup control of at least one application, each application corresponding to one startup control; obtaining a first trigger signal, the first trigger signal being a signal generated upon detecting a trigger operation on a startup control of a target application, the target application being any one of the at least one application; obtaining an application video stream when the computer device has not finished downloading a client of the target application, the application video stream being a video stream formed by application screens generated during running of a first client, the first client being a client of the target application run on a server; and displaying a first application interface of the target application according to the application video stream.

According to one aspect, one or more non-transitory storage media storing computer-readable instructions are provided, the computer-readable instructions, when executed by one or more processors, causing the one or more processors to perform: displaying an application startup management interface, the application startup management interface including at least one startup control of at least one application, each application corresponding to one startup control; obtaining a first trigger signal, the first trigger signal being a signal generated upon detecting a trigger operation on a startup control of a target application, the target application being any one of the at least one application; obtaining an application video stream when the terminal has not finished downloading a client of the target application, the application video stream being a video stream formed by application screens generated during running of a first client, the first client being a client of the target application run on a server; and displaying a first application interface of the target application according to the application video stream.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with the present disclosure. On the contrary, the implementations are merely examples of apparatuses and methods that are described in detail in the appended claims and that are consistent with some aspects of the present disclosure.

The solutions provided by the present disclosure can be used in a real scenario in which people use a terminal to run an application program in daily life. For ease of understanding, some terms and application scenarios are first described briefly below.

(1) Playing while Downloading

Playing while downloading means that in a process of downloading a game, a user can play the game in advance without waiting for the downloading of the game to complete.

(2) Cloud Gaming

Cloud gaming is a gaming mode based on cloud computing. In a cloud gaming mode, a game is run on a server, a rendered game screen is encoded and then, is transmitted to a user by using a network, and the game screen transmitted by the server is decoded on a client and displayed in a game player.

With the development of the field of computers, it has become very common for people to use application programs for entertainment or work in daily life. With the increasing quantity and diversity of application programs, different application programs have their own application program clients. When a user intends to use a specific application program, the user needs to download a client of the application program and install the application program in a terminal, to run the application program on the terminal so as to use the application program.

Figure 1:
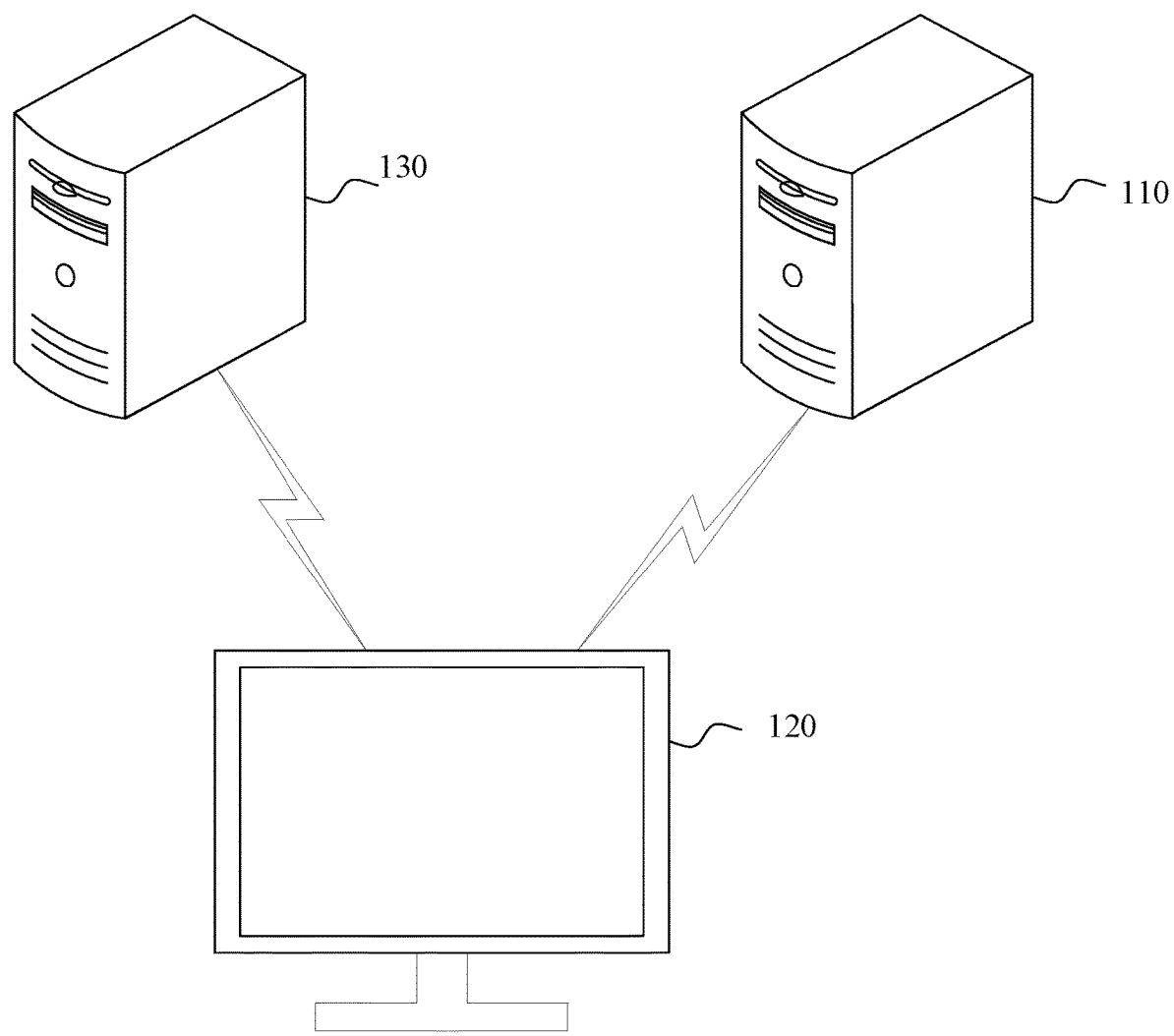
FIG. 1 is a schematic structural diagram of an application program running system according to an embodiment of the present disclosure.

FIG. 1 is a schematic structural diagram of an application program running system according to an embodiment of the present disclosure. The system includes a server 110 and a plurality of terminals 120.

The server 110 is one or more servers, a virtualization platform, or a cloud computing service center, for example, a cloud server for providing basic cloud computing services such as a cloud service, a cloud database, cloud computing, a cloud function, cloud storage, a network service, cloud communication, a middleware service, a domain name service, a security service, a CDN, and a big data and artificial intelligence platform. Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, and expanded readily.

The terminal 120 may be a terminal device having video decoding and video playing functions. For example, the terminal may be a mobile phone, a tablet computer, a desktop computer, or the like.

The terminal 120 is connected to the server 110 by using a communication network. In one embodiment, the communication network may be a wired network or a wireless network.

In one embodiment of the present disclosure, an application program (for example, an application program A) provided by the server 110 has been installed on the terminal 120, and a user may start, by using a client that has been installed on the terminal 120 and that corresponds to the application program A, the application program A installed on the terminal 120. During running of the application program A, the terminal 120 may interact with the server 110 by using a communication network to send or receive information about interaction that needs to be performed in the application program A and the like.

In one embodiment, the wireless network or the wired network uses a standard communication technology and/or protocol. The network is generally the Internet, but may be any network, including, but not limited to, any combination of a local area network (LAN), a metropolitan area network (MAN), a wide area network (WAN), a mobile, wired, or wireless network, and a dedicated network or a virtual private network. In some embodiments, technologies and/or formats, such as the HyperText Markup Language (HTML) and the Extensible Markup Language (XML), are used for representing data exchanged through the network. In addition, all or some links may be encrypted by using common encryption technologies such as Secure Sockets Layer (SSL), Transport Layer Security (TLS), virtual private network (VPN), and Internet Protocol Security (IPsec). In some other embodiments, customized and/or dedicated data communication technologies may alternatively be used in place of or in addition to the foregoing data communication technologies.

In one embodiment, the application program running system may further include a network resource platform 130.

The network resource platform 130 may be a website, an application program platform, or the like. The terminal 120 may also be connected to the network resource platform 130 by using the communication network. The network resource platform 130 may store a client installation package of the application program A, the terminal 120 may download the client installation package of the application program A by using the communication network, and the application program A is installed on the terminal 120. For example, when a user intends to use the application program A and a client of the application program A has not been installed on the terminal 120, the user may control the terminal 120 to download the client installation package of the application program A from the network resource platform 130 by using the communication network, and install the application program A on the terminal 120, so that the terminal 120 can run the application program A.

Figure 2:
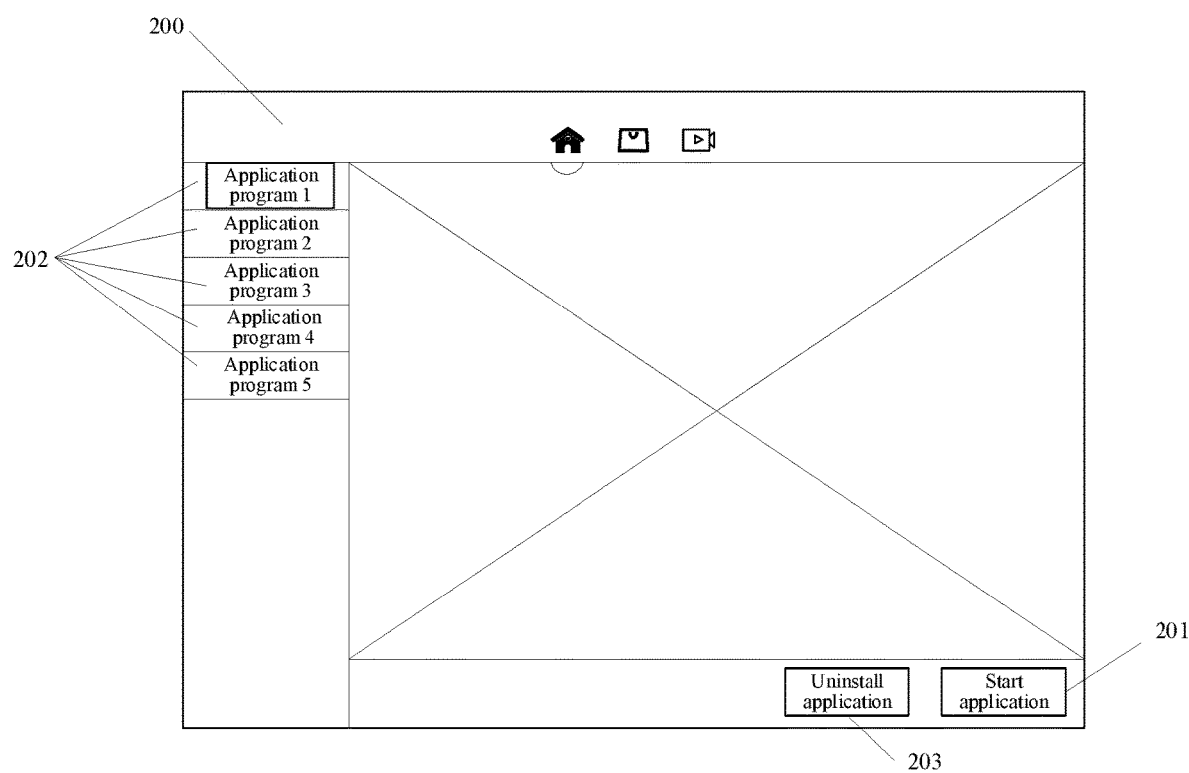
FIG. 2 is a schematic interface diagram of an application startup management interface according to an embodiment of the present disclosure.

FIG. 2 is a schematic interface diagram of an application startup management interface 200 according to an embodiment of the present disclosure. The interface 200 includes a startup control 201, an application program entry 202, and an uninstallation control 203. A user may install a client for managing an application in a terminal, to open the application startup management interface and manage a corresponding application program in the application startup management interface. For example, the user may click or tap to select one application program of the application program entry 202 in the interface, and click or tap the startup control 201, to run the selected application program on the terminal. Alternatively, the user may click or tap to select one application program of the application program entry 202 in the interface, and click or tap the uninstallation control 203, to uninstall the installed application program on the terminal.

Figure 3:
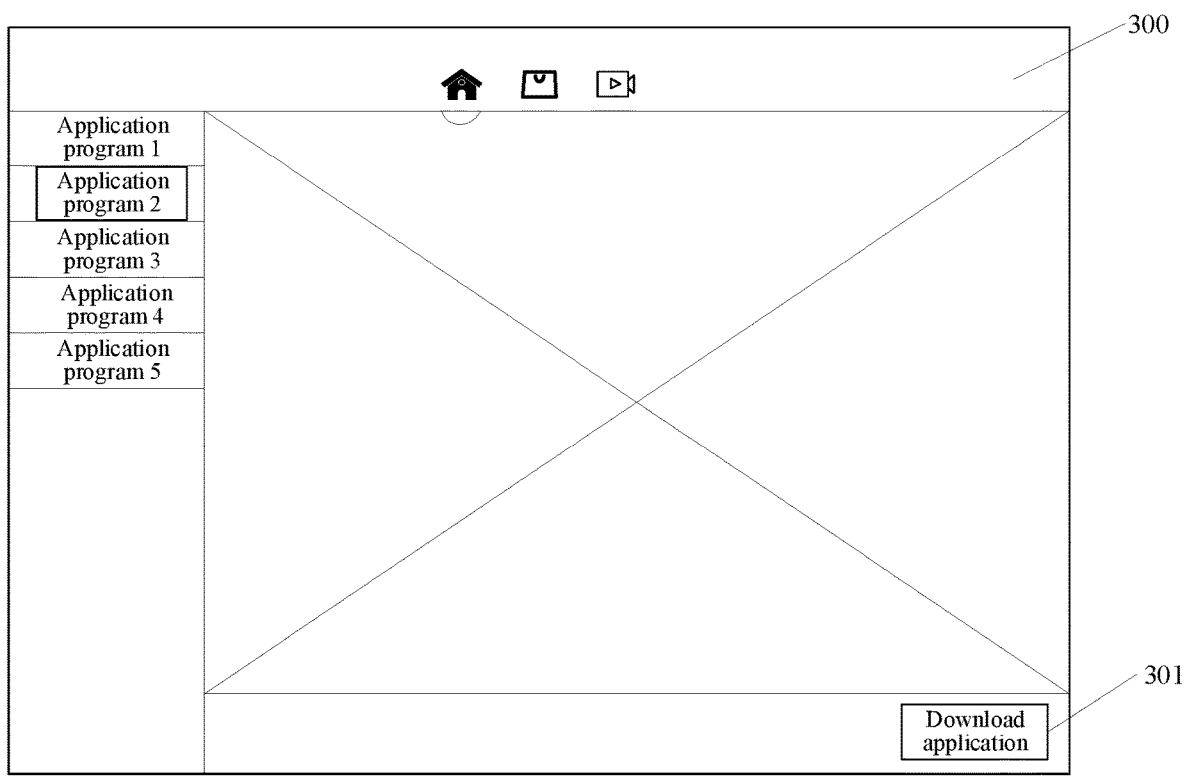
FIG. 3 is a schematic interface diagram of an application startup management interface relating to FIG. 2 according to an embodiment of the present disclosure.

When an application program selected by the user has not been installed on the terminal, the startup control 201 may be displayed in the form of a download control. For example, FIG. 3 is a schematic interface diagram of an application startup management interface 300 relating to FIG. 2 according to an embodiment of the present disclosure. The interface 300 includes a download control 301. An application program 2 in the application program entry 202 shown in FIG. 2 has not been installed on the terminal, and when the user selects the application program 2, the terminal may display the interface shown in FIG. 3, and the download control 301 may prompt the user to download a client installation package of the application program. The user may control, by clicking or tapping the download control, the terminal to download the client installation package of the application program 2.

When the terminal downloads a client installation package of an application program, the user may wait for the terminal to finish downloading (downloading the client installation package of the application program), and trigger the terminal to run the application program after the application program is installed on the terminal. In one embodiment, the application program may be a video application program, a chat application program, a game application program, a shopping application program, a music application program, or the like. For application programs of different types, application program entries displayed in FIG. 2 or FIG. 3 may be different. For example, an application program entry displayed by the video application program may be an entry corresponding to the video application program, or an application program entry displayed by the game application program may be an entry corresponding to the game application program, or an application program entry displayed by the video application program may be an entry corresponding to the video application program, an entry corresponding to the chat application program, an entry corresponding to the shopping application program, or the like. That is, entries corresponding to the application programs of different types may alternatively be displayed in the application startup management interface.

Figure 4:
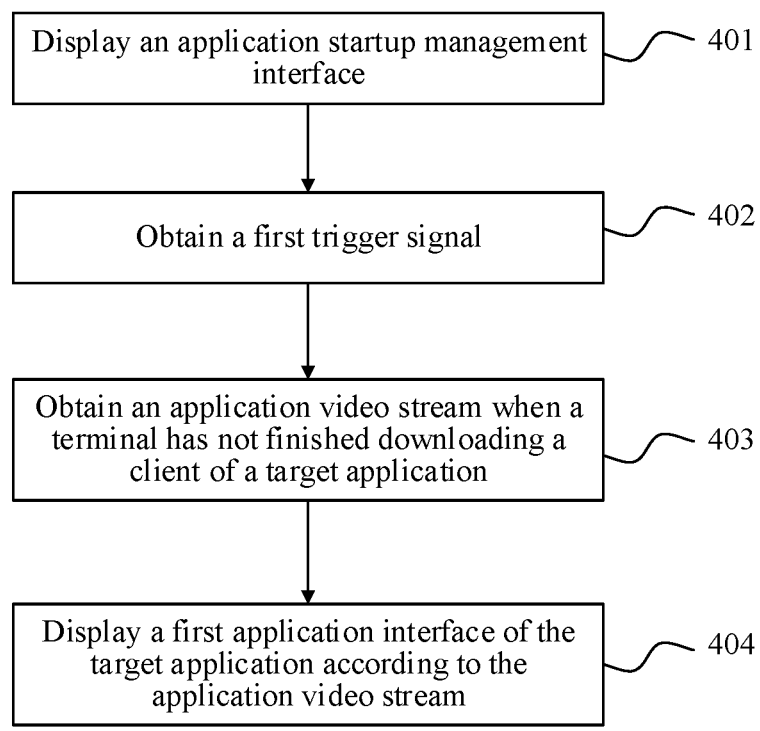
FIG. 4 is a method flowchart of a method for starting an application according to an embodiment of the present disclosure.

To resolve the problems in the related art, the embodiments of the present disclosure provide a method for starting an application. FIG. 4 is a method flowchart of a method for starting an application according to an embodiment of the present disclosure. The method is performed by a terminal and is applicable to a scenario in which the terminal starts or downloads an application program by using the application startup management interface shown in FIG. 2. As shown in FIG. 4, the method may include the following steps.

Step 401. Display an Application Startup Management Interface.

The application startup management interface includes at least one startup control of at least one application, each application corresponding to one startup control.

In one embodiment, the client for managing an application shown in FIG. 2 may be installed on the terminal. A user may perform a series of operations on the terminal to cause the terminal to display an application startup management interface corresponding to the client. In one embodiment, as shown in FIG. 2, the application startup management interface may include a startup control corresponding to at least one application. In one embodiment, the application startup management interface may alternatively include an application program entry corresponding to at least one application, and different application program entries may correspond to different startup controls.

In one embodiment of the present disclosure, the startup control may be a control triggering a corresponding application to start downloading, for example, the download control 301 for downloading an application in FIG. 3. Alternatively, the startup control may be a control triggering a corresponding application to start to be run locally, for example, the startup control 201 for starting an application in FIG. 2.

Step 402. Obtain a First Trigger Signal.

The first trigger signal is a signal generated upon detecting a trigger operation on a startup control of a target application, the target application being one of the at least one application. The trigger operation may be a click or tap operation, a gesture operation, or a face operation.

In one embodiment, the user may perform a trigger operation, such as a click or a tap, on the startup control in the application startup management interface displayed by the terminal, and when detecting the trigger operation, the terminal generates a first trigger signal. The target application may be an application indicated by an application program entry corresponding to the startup control displayed in the application startup management interface. For example, in FIG. 2, when the user clicks or taps a startup control corresponding to an application program 1, the target application may be the application program 1, or when the user clicks or taps a startup control corresponding to an application program 2, the target application may be the application program 2. That is, the target application may be an application indicated by any application program entry.

Step 403. Obtain an Application Video Stream when a Terminal has not Finished Downloading a Client of a Target Application.

The application video stream is a video stream formed by application screens generated during running of a first client, and the first client is a client of the target application run on a server.

In one embodiment, when the terminal has not finished downloading or installing a client of the target application, that is, the client of the target application has not been installed on the terminal, the terminal may obtain a video stream formed by application screens generated when a first client runs the target application. In one embodiment, the first client may be a client pre-deployed on a server, and the server may run the target application by using the first client. In one embodiment, the server may be a cloud server in the scenario shown in FIG. 1.

Step 404. Display a First Application Interface of the Target Application According to the Application Video Stream.

The terminal may obtain, according to the obtained application video stream, the application screens generated when the first client runs the target application, and the application screens are displayed in the terminal, so that when the terminal has not finished downloading the client of the target application, the terminal displays a running interface of the target application.

Based on the foregoing, an application startup management interface is displayed in the terminal, the application startup management interface including at least one startup control of at least one application, each application corresponding to one startup control; a first trigger signal is obtained, the first trigger signal being a signal generated upon detecting a trigger operation on a startup control of a target application, the target application being any one of the at least one application; an application video stream is obtained when the terminal has not finished downloading a client of the target application, the application video stream being a video stream formed by application screens generated during running of a first client, the first client being a client of the target application run on a server; and a first application interface of the target application is displayed according to the application video stream. In the present disclosure, the first trigger signal is obtained, so that the terminal can obtain the application video stream when the terminal has not finished downloading the client of the target application, and the first application interface is displayed in the terminal. The terminal may also display the first application interface without waiting for the downloading of the client of the target application to complete, thereby reducing a download time.

In one embodiment, an application program corresponding to the application startup management interface displayed by the terminal may be a game application program, that is, an application program indicated by at least one application program entry included in the application startup management interface is a game application program. For example, a client for application management corresponding to the application startup management interface is a game platform client, and the user may download a game, uninstall a game, view game data, set a game running parameter, and so on by using the game platform client.

Figure 5:
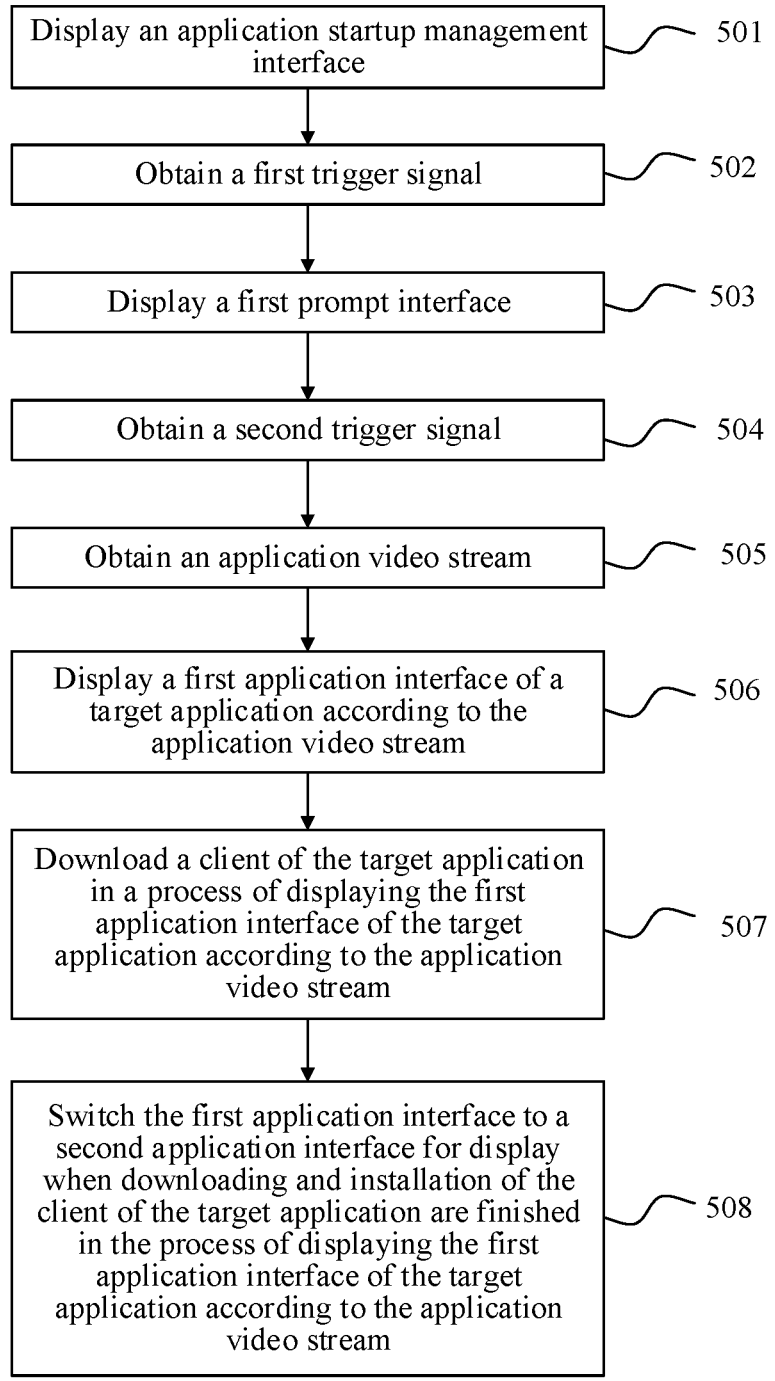
FIG. 5 is a method flowchart of a method for starting an application according to an embodiment of the present disclosure.

An example in which an application program corresponding to the application startup management interface displayed by the terminal is a game application program is used, and the embodiments of the present disclosure provide a method for starting an application. FIG. 5 is a method flowchart of a method for starting an application according to an embodiment of the present disclosure. The method is performed by a terminal and is applicable to a scenario in which the terminal starts or downloads an application program by using the application startup management interface shown in FIG. 2. As shown in FIG. 5, the method may include the following steps.

Step 501. Display an Application Startup Management Interface.

The application startup management interface includes at least one startup control of at least one application, each application corresponding to one startup control.

Figure 6:
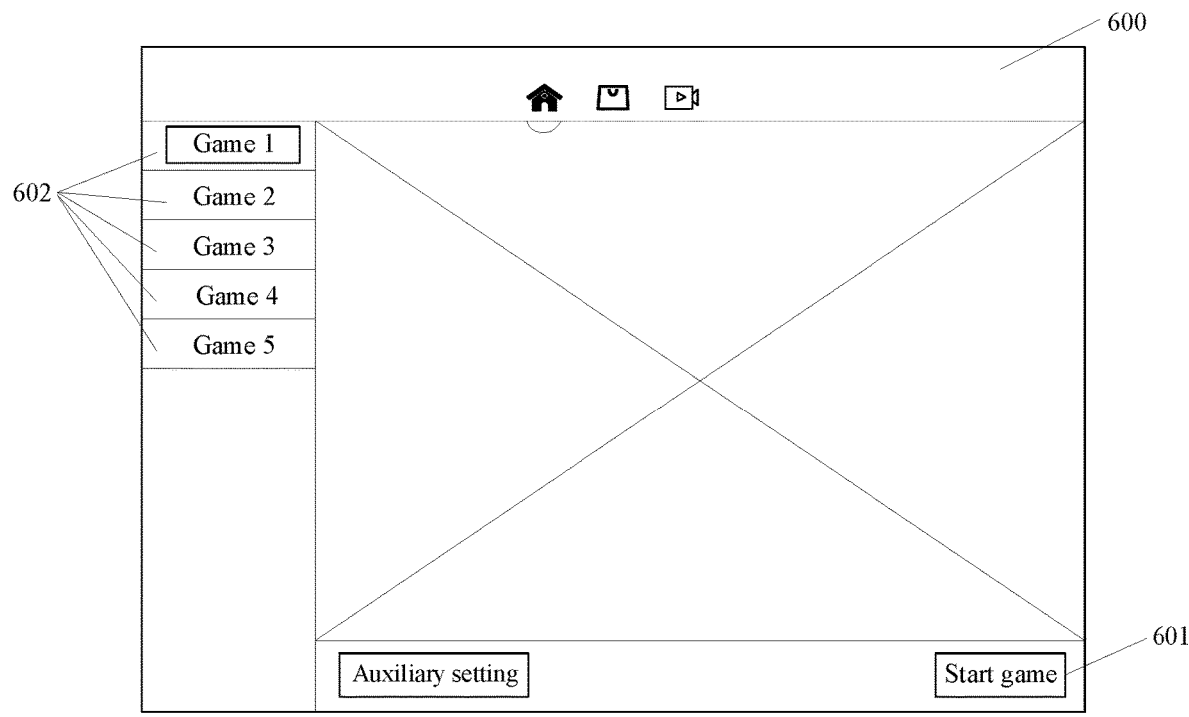
FIG. 6 is a schematic interface diagram of an application startup management interface corresponding to a game application program according to an embodiment of the present disclosure.

If a client for managing a game application program shown in FIG. 2 has been installed on the terminal, a user may open the client to display an application startup management interface in the terminal. FIG. 6 is a schematic interface diagram of an application startup management interface 600 corresponding to a game application program according to an embodiment of the present disclosure. As shown in FIG. 6, the application startup management interface 600 includes a startup control 601 corresponding to at least one game application and a game entry 602 corresponding to at least one game application program. A user may select any game entry in the game entry 602 by clicking or tapping the game entry, and the user may perform a series of management operations on the selected game entry in the application startup management interface 600.

Figure 7:
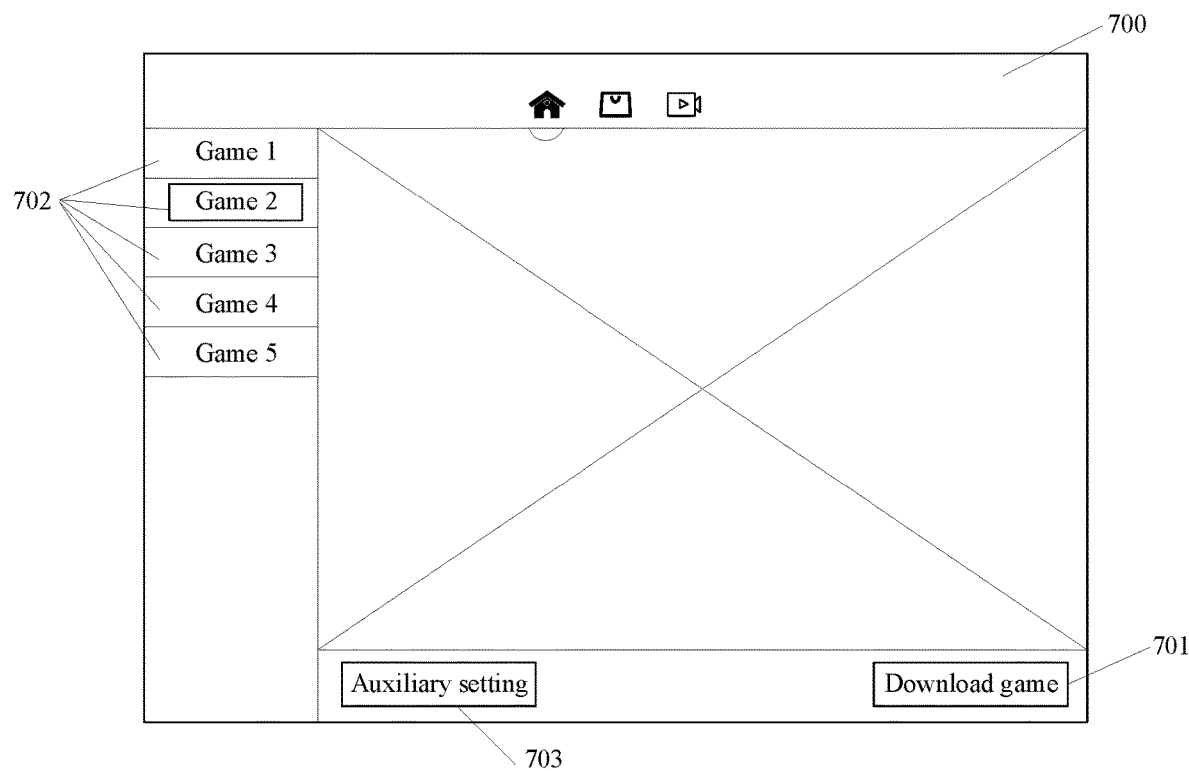
FIG. 7 is a schematic interface diagram of an application startup management interface relating to FIG. 6 according to an embodiment of the present disclosure.

In one embodiment, the manner in which a startup control displays a prompt may vary with different game entries selected by the user. For example, in FIG. 6, the game entry selected by the user is a game 1, a game client corresponding to the game 1 has been installed on the terminal, and the startup control 601 for starting a game is displayed as "Start game", to prompt the user to start a game by triggering the startup control. FIG. 7 is a schematic interface diagram of an application startup management interface 700 relating to FIG. 6 according to an embodiment of the present disclosure. As shown in FIG. 7, the application startup management interface 700 includes a startup control 701 corresponding to at least one game application and a game entry 702 corresponding to at least one game application program. A game entry selected by a user is a game 2, a game client corresponding to the game 2 has not been installed on the terminal, and the startup control 701 for starting a game may be displayed as "Download game", to prompt the user to download a game by triggering the startup control. In one embodiment, in FIG. 7, the game entry selected by the user is the game 2, if a latest version of the game client corresponding to the game 2 has not been installed on the terminal, the startup control 701 for starting a game may be displayed as "Update game", to prompt the user to update the game 2 by triggering the startup control.

In one embodiment, the startup control may alternatively be displayed in the same form. For example, in the terminal, for the game 1 and the game 2 shown in FIG. 6 and FIG. 7, the startup controls are both displayed in the form of "Start game". In FIG. 6, the user may run the game 1 by using the startup control. In FIG. 7, the user may download the game 2 by using the startup control. A specific display form of the startup control is not limited in the present disclosure.

Step 502. Obtain a First Trigger Signal.

The first trigger signal is a signal generated upon detecting a trigger operation on a startup control of a target application, the target application being any one of the at least one application.

When the user triggers a startup control in the application startup management interface, the terminal may obtain a first trigger signal generated when the startup control is triggered. A game application corresponding to a game entry selected by the user in the application startup management interface may be a target application corresponding to the startup control. In one embodiment, the user may trigger the startup control in a manner such as a mouse click, a shortcut key, or a touch.

In one embodiment, when the startup control is triggered, the terminal may execute a corresponding command. For example, in FIG. 6, when the user selects the game 1, and the startup control "Start game" corresponding to the game 1 is triggered by the user, the terminal can run the game. Alternatively, in FIG. 7, when the user selects the game 2, and the startup control "Download game" corresponding to the game 2 is triggered by the user, the terminal may download a client of the game 2.

Step 503. Display a First Prompt Interface.

The first prompt interface is configured to prompt whether to run a first client by using the server, and the first client is a client that is pre-deployed on the server and may run the target application.

In one embodiment, when the terminal obtains the first trigger signal, the terminal may determine, according to whether a client of the target application has been installed on the terminal, whether to display a first prompt interface. In one embodiment, when installation of the client of the target application on the terminal has not been finished, the terminal may display the first prompt interface. For example, as shown in FIG. 7, a game client of the game 2 has not been installed on the terminal, and when the user triggers the startup control in FIG. 7, the terminal may display the first prompt interface.

Figure 8:
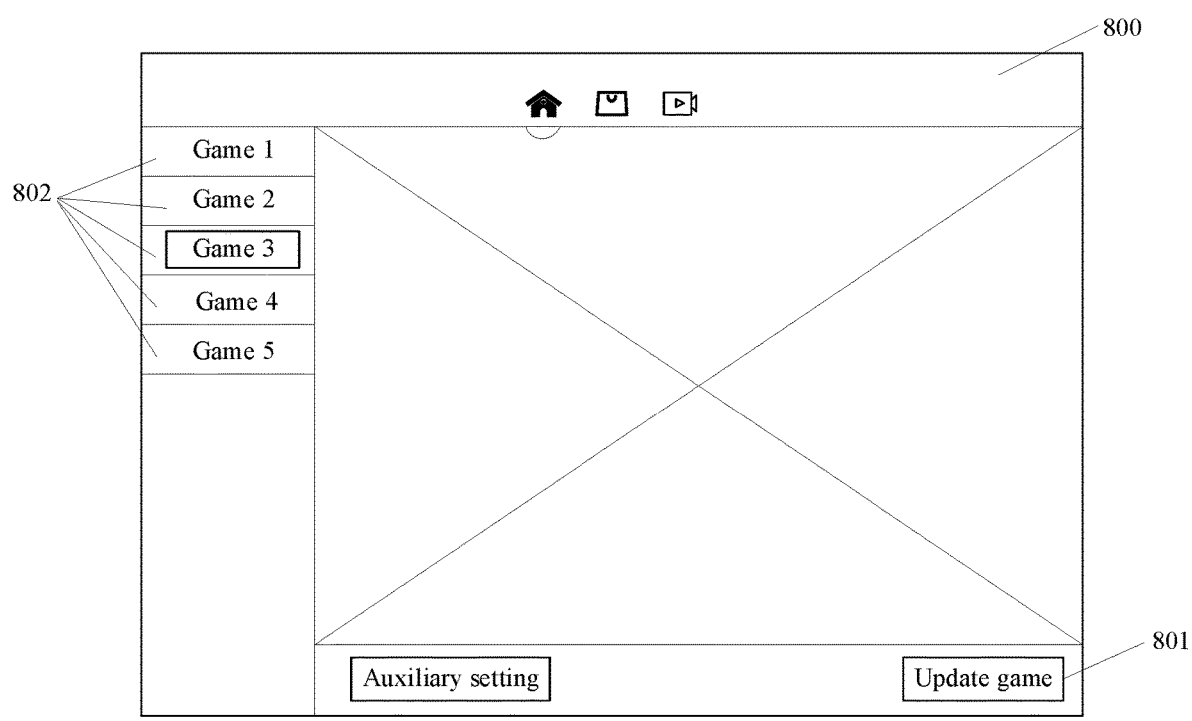
FIG. 8 is a schematic interface diagram of an application startup management interface relating to FIG. 6 according to an embodiment of the present disclosure.

In another embodiment, when a client of a latest version of the target application has not been installed on the terminal, the terminal may display the first prompt interface. FIG. 8 is a schematic interface diagram of an application startup management interface 700 relating to FIG. 6 according to an embodiment of the present disclosure. As shown in FIG. 8, the application startup management interface 800 includes a startup control 801 corresponding to at least one game application and a game entry 802 corresponding to at least one game application program. A game entry selected by the user is a game 3, a game client of a latest version corresponding to the game 3 has not been installed on the terminal, and the startup control 801 corresponding to the game application may be displayed as "Update game", to prompt the user to update a game by triggering the startup control. When the user triggers the startup control in FIG. 8, the terminal may display the first prompt interface.

In one embodiment, when obtaining the first trigger signal, and before determining that the client of the target application has not been installed on the terminal and displaying the first prompt interface, the terminal may further pull up a download task of the client of the target application. Alternatively, when obtaining the first trigger signal, and before determining that a client of a latest version of the target application has not been installed on the terminal and displaying the first prompt interface, the terminal may further pull up an update task of the client of the target application.

Figure 9:
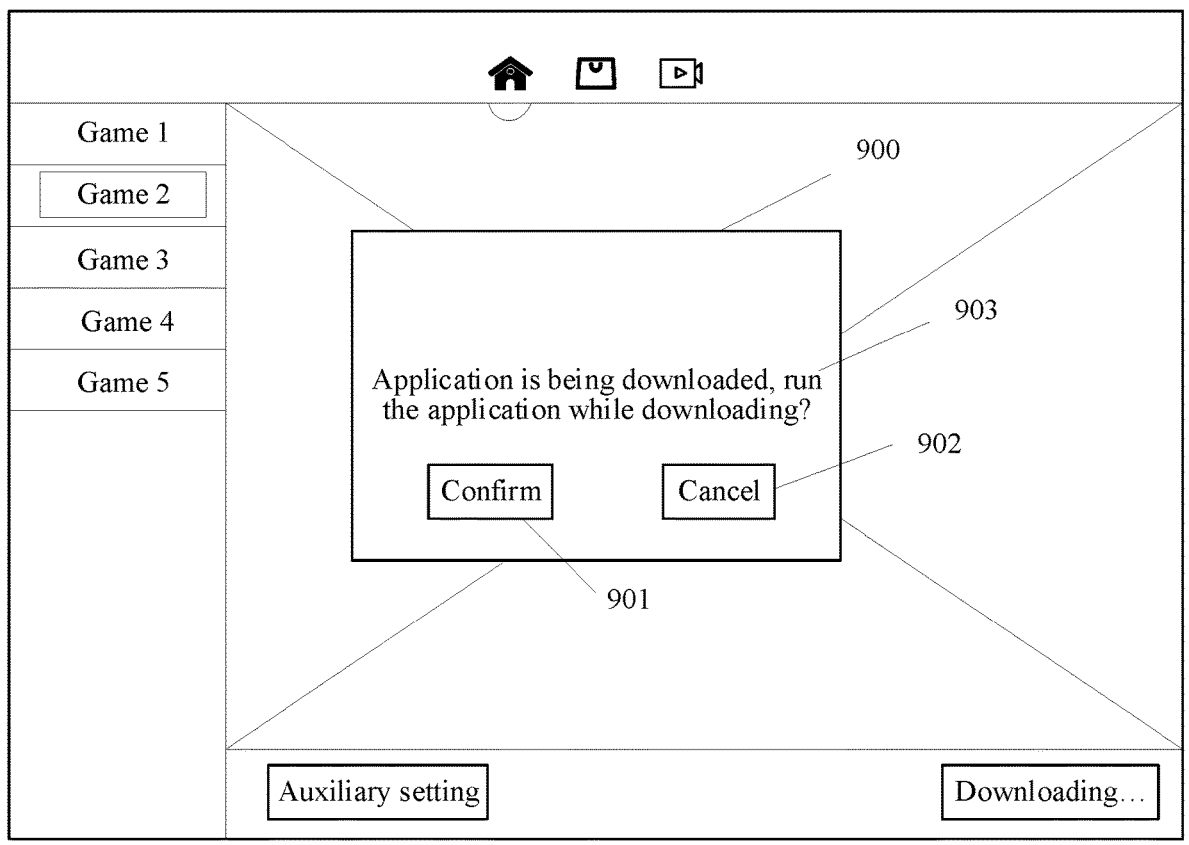
FIG. 9 is a schematic interface diagram of a first prompt interface displayed by triggering a startup control in FIG. 7 according to an embodiment of the present disclosure

For example, when the client of the target application has not been installed on the terminal, the first prompt interface is displayed. FIG. 9 is a schematic interface diagram of a first prompt interface 900 according to an embodiment of the present disclosure. As shown in FIG. 9, the first prompt interface 900 includes a confirmation control 901 and a cancel control 902. In one embodiment, the first prompt interface 900 further includes prompt information 903 for prompting a user to choose whether to run a first client by using the server (e.g., while waiting for the download to complete). In one embodiment, the first client may be pre-deployed on the server by a developer, and in response to an operation instruction of the terminal, the server may run the first client. In one embodiment, different target applications may correspond to different first clients, that is, the developer may pre-deploy first clients corresponding to different applications on the server. In one embodiment, the server may be a cloud server.

Figure 10:
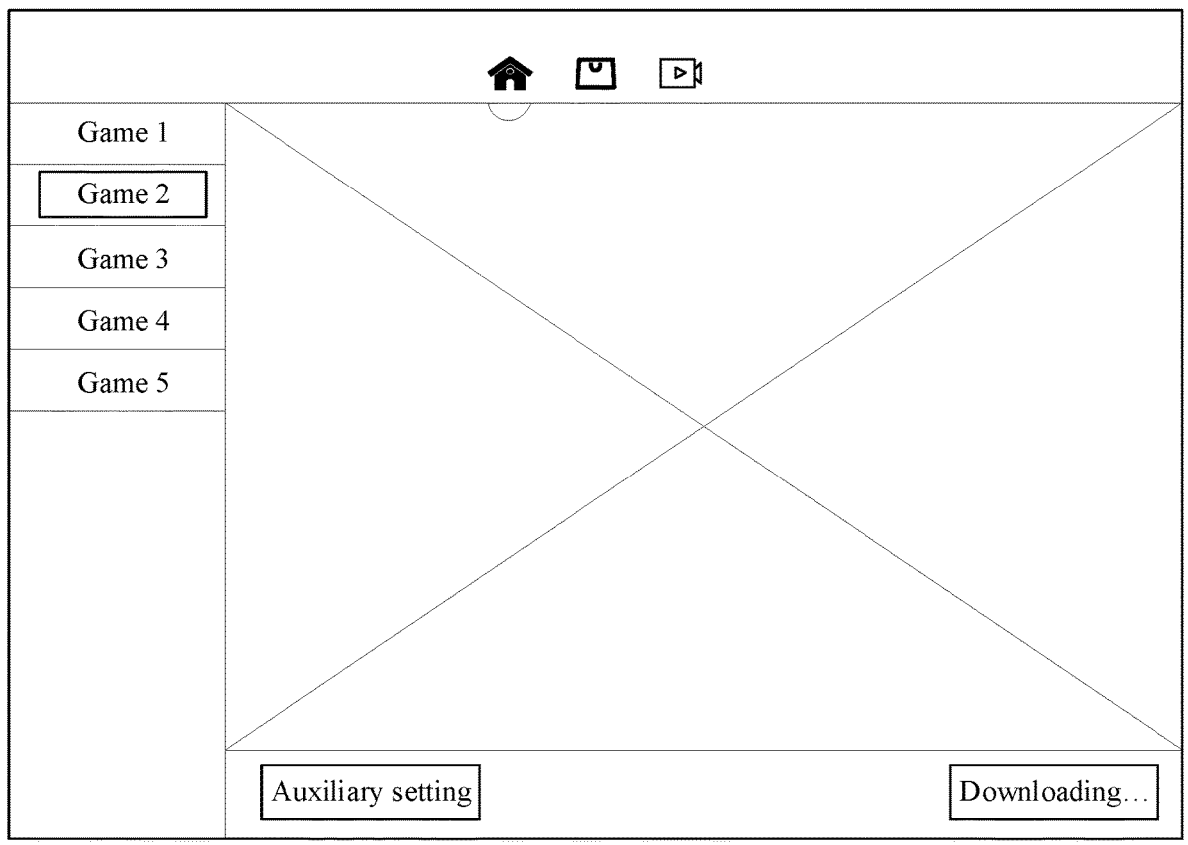
FIG. 10 and FIG. 11 are schematic interface diagrams of two application startup management interfaces according to an embodiment of the present disclosure.
Figure 11:
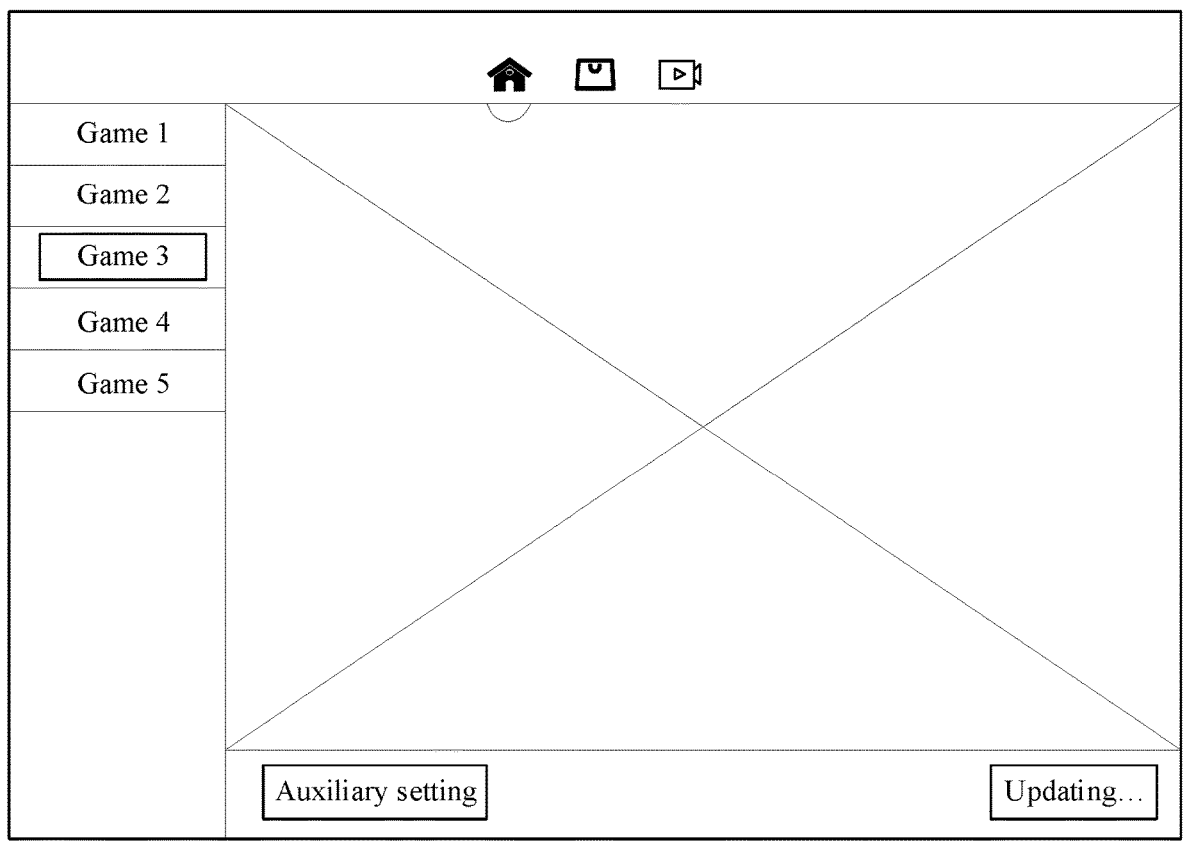

In one embodiment, when receiving the first trigger signal, the terminal may further display indication information corresponding to the startup control according to whether the client of the target application has been installed on the terminal. The indication information may be used for indicating that the terminal is currently downloading or updating the client of the target application. For example, FIG. 10 and FIG. 11 are schematic interface diagrams of two application startup management interfaces according to an embodiment of the present disclosure. FIG. 10 corresponds to a scenario when the terminal receives the first trigger signal, the terminal changes indication information displayed by the startup control shown in FIG. 7 from "Download game" to "Downloading". FIG. 11 corresponds to a scenario when the terminal receives the first trigger signal, the terminal changes indication information displayed by the startup control shown in FIG. 8 from "Update game" to "Updating".

In one embodiment, when the terminal obtains the first trigger signal and the client of the target application has been installed on the terminal, the terminal may directly run the target application without displaying the first prompt interface. For example, as shown in FIG. 6, the game client of the game 1 has been installed on the terminal, and when the user triggers the startup control in FIG. 6, the terminal may run the game 1 by using the game client installed on the terminal.

Step 504. Obtain a Second Trigger Signal.

The second trigger signal is a signal generated upon detecting an operation of confirming to run the first client by using the server performed in the first prompt interface by the terminal, that is, the second trigger signal is a signal generated when the operation of confirming to run the first client by using the server is received, and the operation of confirming to run the first client by using the server is performed in the first prompt interface. For example, in FIG. 9, when the user triggers the confirmation control 901 in the first prompt interface shown in FIG. 9, the terminal may obtain a trigger signal (that is, the second trigger signal) generated when the confirmation control 901 is triggered.

In one embodiment, when obtaining the second trigger signal, the terminal may send, by using a client for managing an application, an instruction for running the target application by using the first client to the server. When receiving the instruction for running the target application sent by the terminal, the server may start the first client internally pre-deployed on the server, and run the target application by using the client. In one embodiment, using the target application being the game 2 in FIG. 7 as an example, when obtaining the second trigger signal, the terminal may send, by using the client for managing an application, an instruction for running the game 2 by using the first client to the server. When receiving the instruction for running the game 2 sent by the terminal, the server may start a client (that is, the first client) of the game 2 internally pre-deployed on the server and run the game 2 by using the client.

In one embodiment, when running the game 2 by using the first client, the server may obtain an account with which the terminal currently logs in to the client for managing an application, log in to the first client, and run the game 2 according to the account. How and with which type of account the server logs in to the first client and then runs the game 2 are not limited in the present disclosure.

When obtaining the second trigger signal, the terminal performs a step of obtaining an application video stream, that is, step 505 is performed. In one embodiment, when the user triggers the cancel control 902 in the first prompt interface shown in FIG. 9, the terminal may receive a trigger signal generated when the cancel control is triggered. In this case, the terminal may still perform the download task of the target application. That is, when the user triggers the cancel control in the first prompt interface, the terminal may continuously perform the pulled-up download task or update task of the client of the target application.

Step 505. Obtain an Application Video Stream.

The application video stream is a video stream formed by application screens generated during running of the first client.

In one embodiment, the server may generate the application video stream according to application screens of the target application generated when the server runs the first client, that is, the server sends the application screens generated during running of the target application to the terminal in the form of a video stream, and the terminal receives the application video stream sent by the server.

Figure 12:
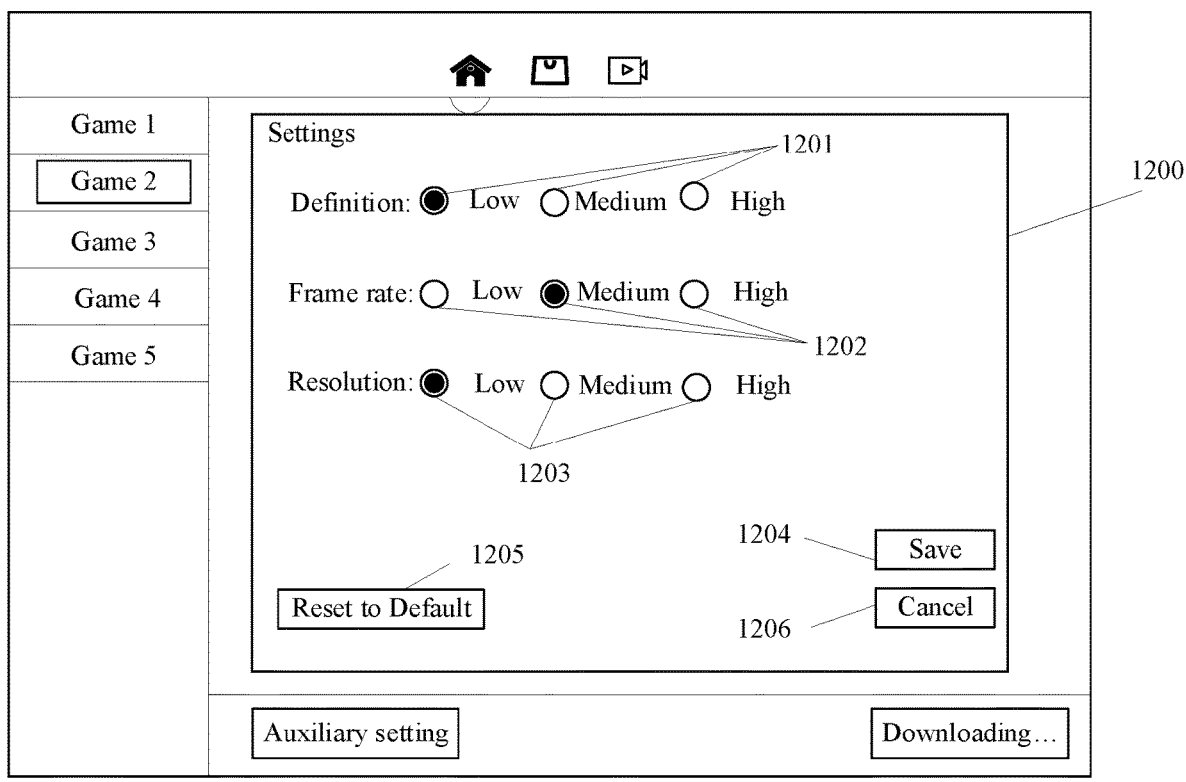
FIG. 12 is a schematic interface diagram of a setting interface relating to FIG. 7 according to an embodiment of the present disclosure.

In one embodiment, using the target application being a game application as an example, when generating an application video stream, the server may acquire each frame of game screen generated during running of the first client, compress and encode each acquired frame of game screen by using a video encoding technology, and transmit, by using a network, the decoded frame of game screen to the client for managing an application in the terminal. In one embodiment, when compressing and encoding each acquired frame of game screen, the server may perform compression according to a quality parameter set by the user in the application startup management interface. Referring to FIG. 7, the application startup management interface shown in FIG. 7 further includes an auxiliary setting control 703. The user may click or tap the auxiliary setting control 703 to enter a setting interface for setting the game 2. FIG. 12 is a schematic interface diagram of a setting interface 1200 relating to FIG. 7 according to an embodiment of the present disclosure. As shown in FIG. 12, the setting interface 1200 includes a definition option control 1201, a frame rate option control 1202, a resolution option control 1203, a Save control 1204, a Reset to Default control 1205, a cancel control 1206, or the like. The user may select a corresponding control to set quality of a screen generated when the terminal runs the game 2. For example, the user may select an option control for setting the definition to medium and click or tap the Save control. When the terminal runs the game 2, the definition of a game screen displayed in the terminal is the definition that is set this time.

In one embodiment, the server may obtain a quality parameter set by the user in the terminal, encode each acquired frame of game screen according to the parameter that is set, and generate an application video stream meeting the quality parameter. In one embodiment, the encoding quality of the server may alternatively depend on the broadband performance of a current connection between the terminal and the server, and the server may adaptively adjust the encoding quality according to the broadband quality. For example, when the broadband quality of the connection between the terminal and the server supports a quality parameter of a high definition while meeting a requirement for downloading the client of target application, the server performs encoding according to encoding quality of a high definition during video encoding. When the broadband quality of the connection between the terminal and the server becomes poor, the server may properly reduce the encoding quality to ensure a downloading speed of the client of the target application, or the server reduces a downloading speed of the client of the target application to provide the encoding quality of the high definition.

In one embodiment, after receiving the first trigger signal to pull up the download task of the target application, and receiving the second trigger signal, the terminal may further detect whether downloading of the client of the target application has been finished, and when the terminal has not finished downloading the client of the target application, the terminal obtains the application video stream from the server.

Step 506. Display a First Application Interface of the Target Application According to the Application Video Stream.

In one embodiment, when obtaining the second trigger signal, the terminal may invoke an application player program in the client for managing an application, open an application player, and display the obtained application video stream in the application player opened in the terminal, to display a first application interface of the target application in the terminal. In one embodiment, the application player may decode the application video stream obtained by the terminal, to obtain each frame of application screen included in the application video stream, and play the frame of application screen in the application player, to display the first application interface of the target application.

In one embodiment, when the target application is a game application, the application player may be a game player. In one embodiment, the game player may further obtain a control instruction, the control instruction being an instruction corresponding to a control operation performed based on the first application interface. For example, the first application interface is displayed in a current window of the terminal. When the user performs control operations on the terminal by using at least one of a keyboard, a mouse, a joystick, or a gamepad, the game player may obtain control instructions corresponding to the control operations. For example, when the user presses an R key in the keyboard, the game player may obtain a control instruction corresponding to the R key, and send the control instruction to the server.

In one embodiment, after receiving the control instruction, the server may parse the received control instruction by using an instruction parser, input a parsing result to the game application by using the first client, and control running of the game application. In one embodiment, the server acquires each frame of game screen generated when the game application is run by using the first client without being interrupted in the process in which the server inputs the parsing result to the game application by using the first client.

Step 507. Download a Client of the Target Application in a Process of Displaying the First Application Interface of the Target Application According to the Application Video Stream.

In one embodiment, the terminal also downloads a client of the target application in a process of displaying the first application interface of the target application according to the application video stream. That is, when the terminal receives the first trigger signal, the pulled-up download task or update task of the client of the target application is not interrupted.

Figure 13:
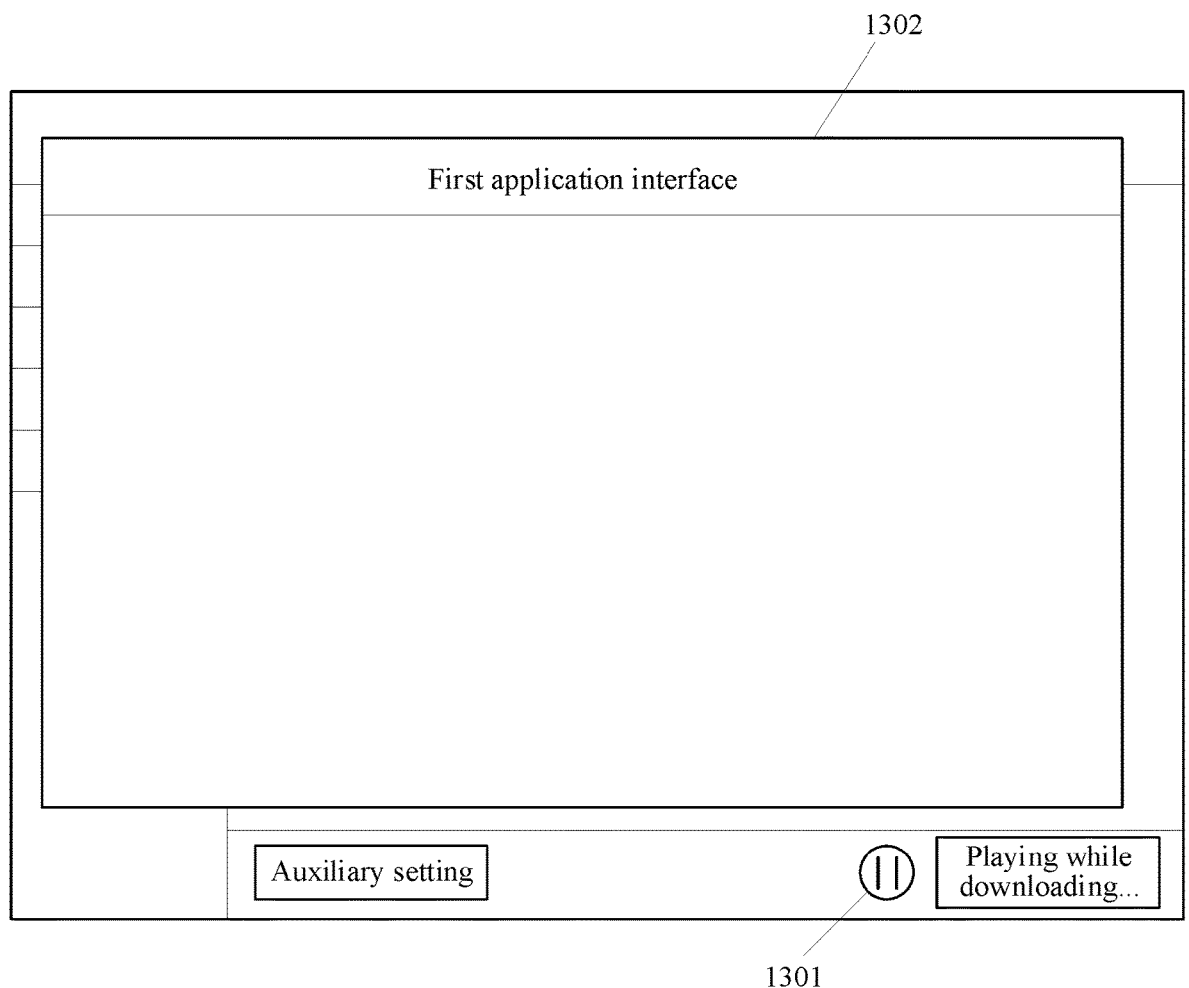
FIG. 13 is a schematic interface diagram of an application startup management interface according to an embodiment of the present disclosure.

In one embodiment, the terminal may display prompt information corresponding to the startup control in the process of displaying the first application interface of the target application according to the application video stream. The prompt information may be used for prompting that the first application interface is an application interface displayed in a process of downloading the client of the target application. For example, FIG. 13 is a schematic interface diagram of an application startup management interface according to an embodiment of the present disclosure. FIG. 13 corresponds to a scenario when the terminal receives the second trigger signal generated when the confirmation control of the first prompt interface in FIG. 10 is triggered, the terminal changes prompt information displayed by the startup control shown in FIG. 10 from "Downloading" to "Playing while downloading" as shown in FIG. 13.

Figure 14:
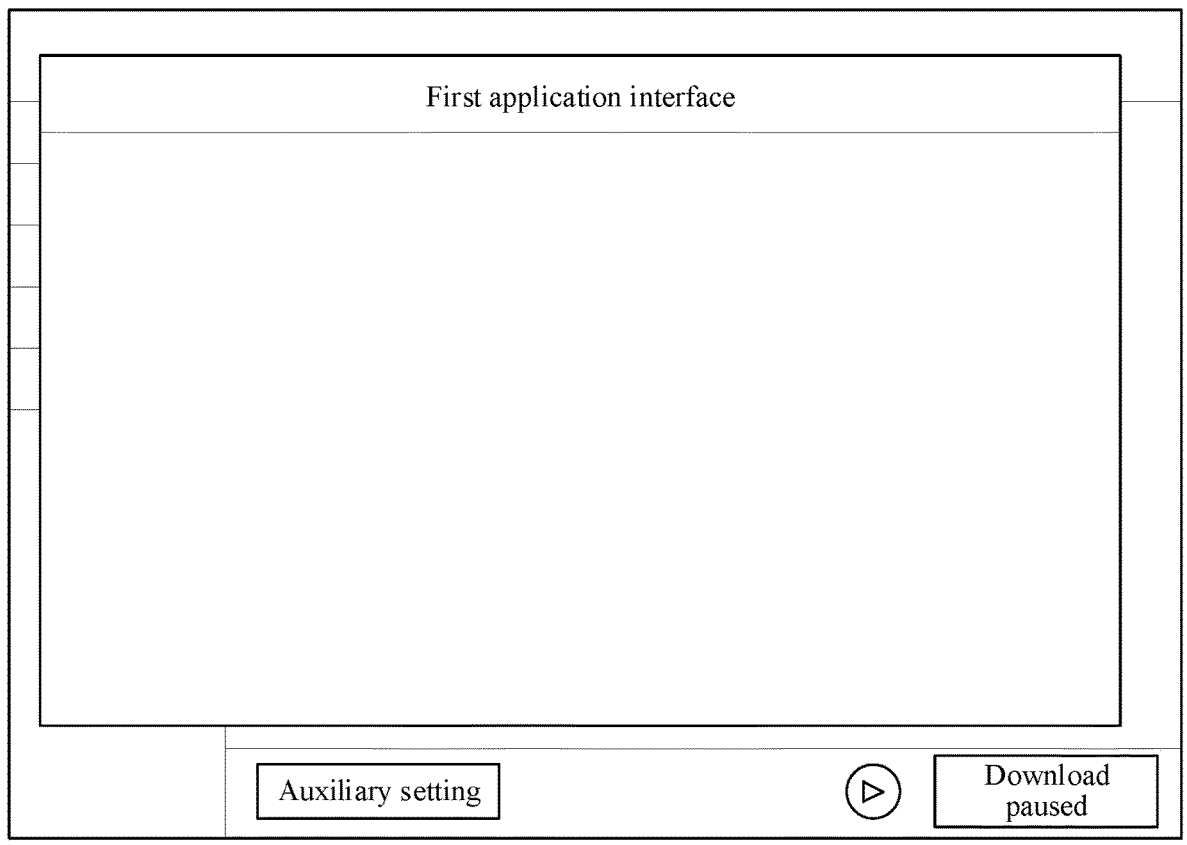
FIG. 14 is a schematic interface diagram of an application startup management interface according to an embodiment of the present disclosure.

In one embodiment, the application startup management interface shown in FIG. 13 further includes a download pause control 1301. The user may click or tap the download pause control 1301 in a process in which the terminal displays the first application interface, to control the terminal to pause downloading of the client of the target application in the process of displaying the first application interface of the target application according to the application video stream. In one embodiment, FIG. 14 is a schematic interface diagram of an application startup management interface according to an embodiment of the present disclosure. FIG. 14 corresponds to a scenario when the user clicks or taps the download pause control 1301 in FIG. 13, the terminal changes prompt information displayed by the startup control in FIG. 13 from "Playing while downloading" to "Download paused" as shown in FIG. 14.

In one embodiment, a first application interface 1302 is further displayed in the application startup management interface shown in FIG. 13. The user may further close the first application interface 1302 shown in FIG. 13 and re-display the first application interface by using the startup control.

Step 508. Switch the First Application Interface to a Second Application Interface for Display when Downloading and Installation of the Client of the Target Application are Finished in the Process of Displaying the First Application Interface of the Target Application According to the Application Video Stream.

The second application interface is an application interface displayed according to an application screen generated during running of a second client, and the second client is a client of the target application installed on the terminal.

When finishing downloading the client of the target application, the terminal may install the client according to a default installation path. The default installation path may be an installation path allocated to the target application by default in the terminal. Alternatively, when finishing downloading the client of the target application, the terminal may install the client according to an installation path set by the user. For example, the user may trigger the terminal to set the installation path of the target application in the setting interface in response to a display setting interface of the auxiliary setting control shown in FIG. 7. When finishing installing the client of the target application, the terminal may switch the first application interface to a second application interface for display.

In one embodiment, the terminal may display a second prompt interface in the first application interface, and perform the step of switching the first application interface to a second application interface for display when a third trigger signal is obtained requesting a user selection about whether to run the client of the target application locally on the terminal, the third trigger signal being a signal generated upon detecting an operation of confirming to run the client locally performed in the second prompt interface. The operation of confirming to run the client locally is performed in the second prompt interface.

Figure 15:
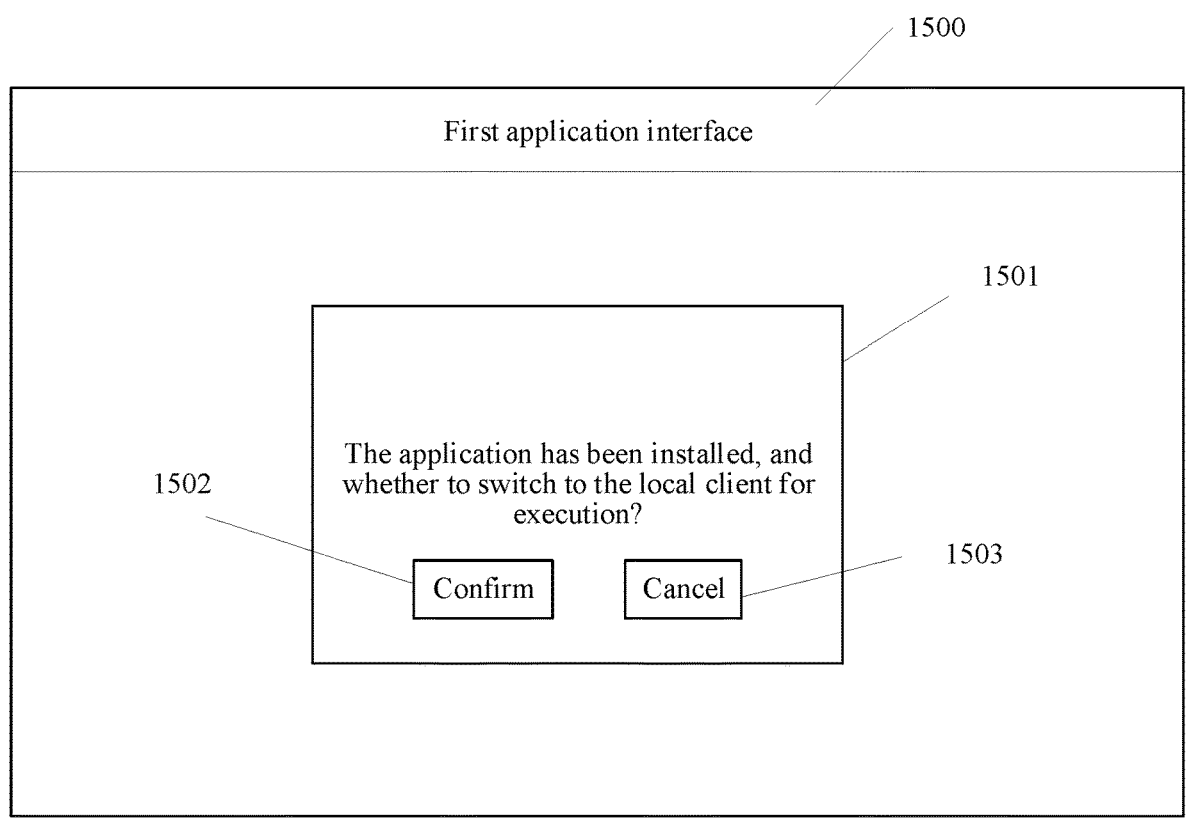
FIG. 15 is a schematic interface diagram of a first application interface according to an embodiment of the present disclosure.

FIG. 15 is a schematic interface diagram of a first application interface 1500 according to an embodiment of the present disclosure. As shown in FIG. 15, the first application interface 1500 includes a second prompt interface 1501, a confirmation control 1502, and a cancel control 1503. When the user selects the confirmation control 1502, the terminal may receive a third trigger signal and switch the first application interface to a second application interface for display.

In one embodiment, in the process of displaying the first application interface of the target application according to the application video stream, when downloading and installation of the client of the target application are finished, a switching control is displayed corresponding to the first application interface. When a fourth trigger signal is obtained, the first application interface is switched to the second application interface for display, the fourth trigger signal being a signal generated when a trigger operation performed on the switching control is received.

Figure 16:
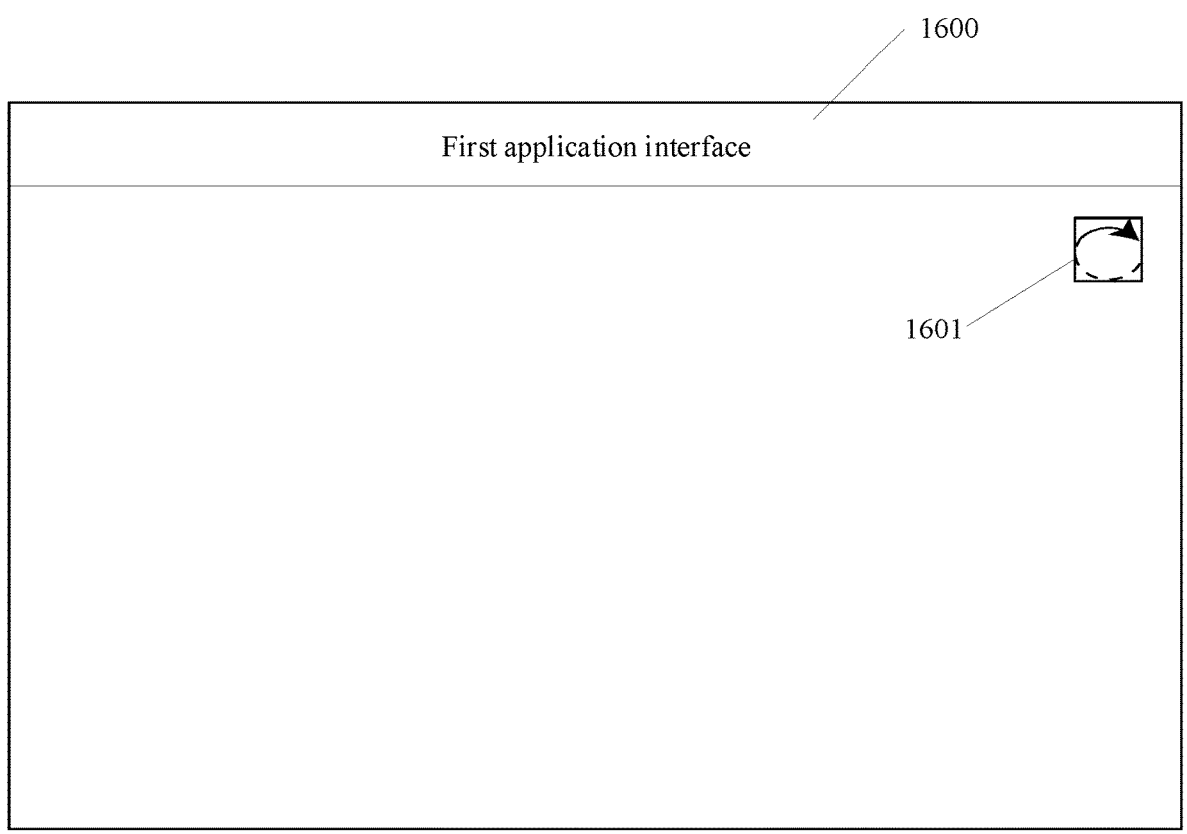
FIG. 16 is a schematic interface diagram of a first application interface according to an embodiment of the present disclosure.

FIG. 16 is a schematic interface diagram of a first application interface 1500 according to an embodiment of the present disclosure. As shown in FIG. 16, the first application interface 1600 includes a switching control 1601. When the user selects the switching control 1601, the terminal may receive a fourth trigger signal and switch the first application interface to the second application interface for display.

Figure 17:
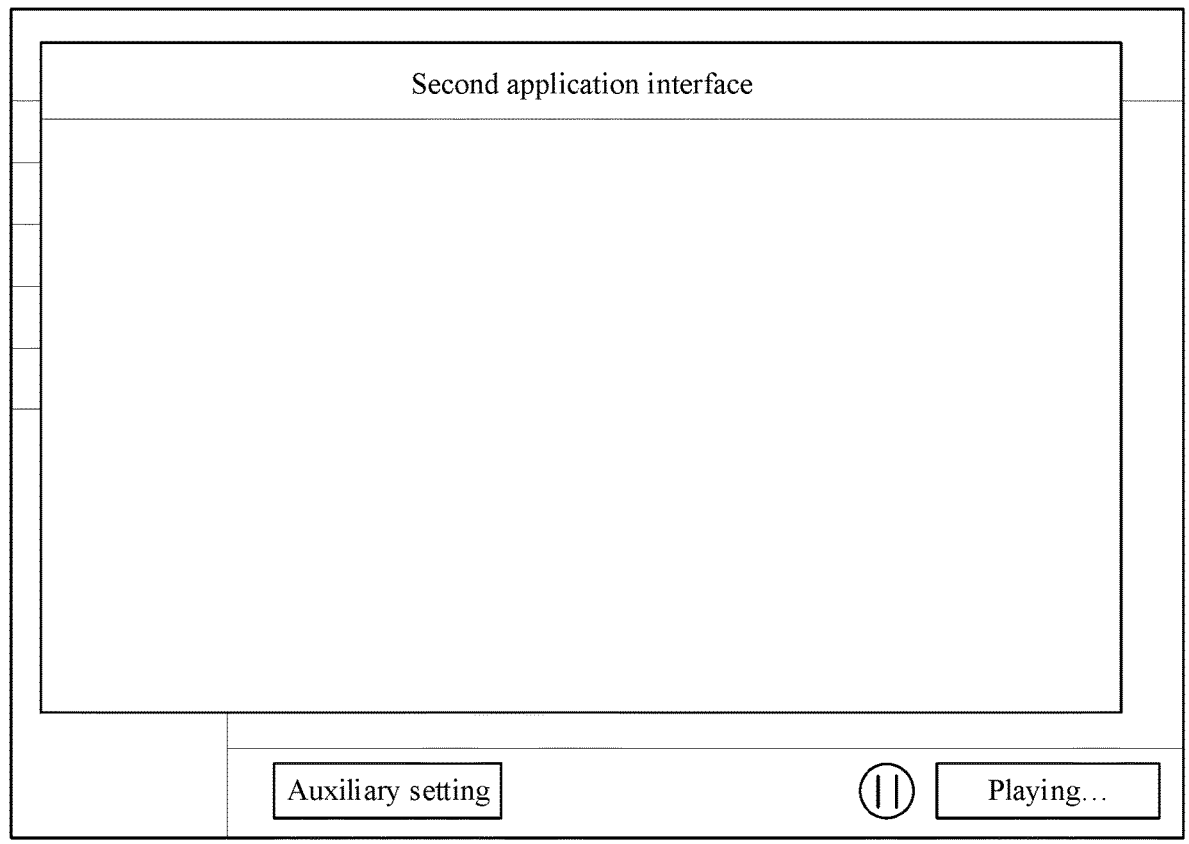
FIG. 17 is a schematic interface diagram of an application startup management interface according to an embodiment of the present disclosure.

In one embodiment, when the terminal switches the first application interface to the second application interface, the terminal may alternatively display local prompt information corresponding to the startup control. The local prompt information may be used for prompting that the second application interface is an application interface displayed when the terminal runs a local client of the target application. FIG. 17 is a schematic interface diagram of an application startup management interface 200 according to an embodiment of the present disclosure. FIG. 17 corresponds to a scenario after the terminal finishes downloading and installing the client of the target application, and switches the first application interface to the second application interface as shown in FIG. 13, the terminal changes prompt information displayed by the startup control shown in FIG. 13 from "Playing while downloading" to "Playing" shown in FIG. 17, and displays the second application interface.

In one embodiment, after the user finishes downloading the client of the target application, when the target application is started again subsequently by using the client for managing an application, the target application is directly started on the local client.

When the terminal shown in FIG. 8 needs to update the local client, the client for managing an application provided by the embodiments of the present disclosure may also perform the foregoing steps, so that the terminal may run the target application in the terminal while updating the client of the target application. For details of performing the steps, reference may be made to the manner provided in the foregoing embodiment. Details are not described herein again.

Based on the foregoing, an application startup management interface is displayed in the terminal, the application startup management interface including at least one startup control of at least one application, each application corresponding to one startup control; a first trigger signal is obtained, the first trigger signal being a signal generated upon detecting a trigger operation on a startup control of a target application, the target application being any one of the at least one application; an application video stream is obtained when the terminal has not finished downloading a client of the target application, the application video stream being a video stream formed by application screens generated during running of a first client, the first client being a client of the target application run on a server; and a first application interface of the target application is displayed according to the application video stream. In the present disclosure, the first trigger signal is obtained, so that the terminal can obtain the application video stream when the terminal has not finished downloading the client of the target application, and the first application interface is displayed in the terminal. The terminal may also display the first application interface without waiting for the downloading of the client of the target application to complete and without adding additional command logic to an installation package, thereby improving the efficiency of developing an application.

In addition, in the solution provided in the embodiments of the present disclosure, after the terminal finishes downloading and installing the client of the target application, the terminal is controlled to switch the first application interface to the second application interface, thereby reducing transmission of a video stream, and saving broadband resources of the terminal.

Figure 18:
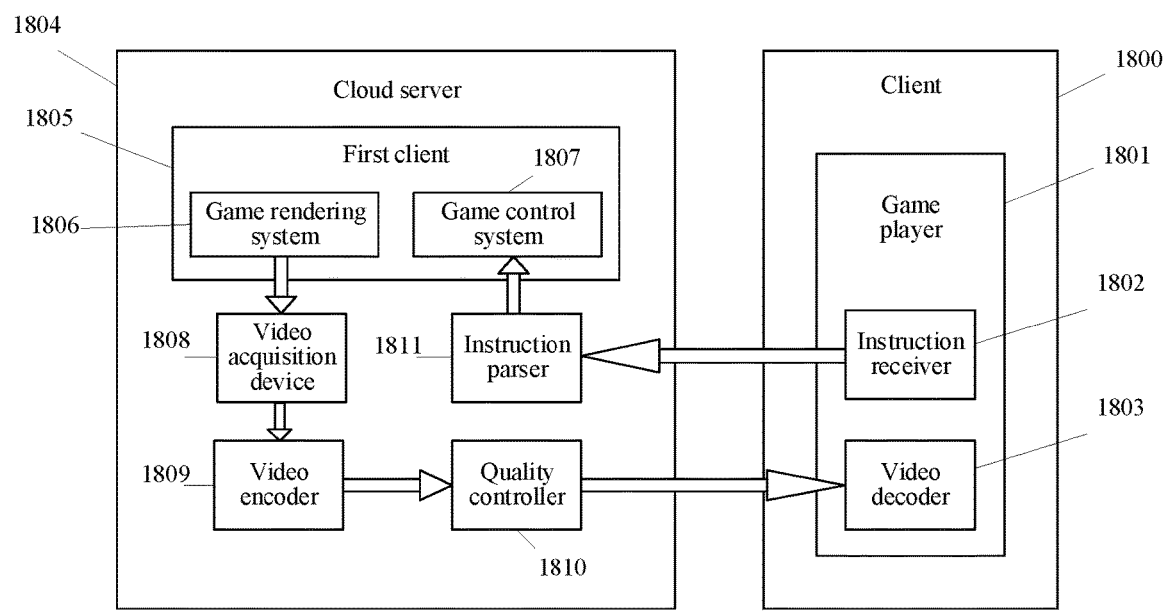
FIG. 18 is a schematic structural diagram of running, by a client by using a cloud server, a target application that has not been downloaded according to an embodiment of the present disclosure.

Using a game application as an example, FIG. 18 is a schematic structural diagram of running, by a client 1800 by using a cloud server, a target application that has not been downloaded according to an embodiment of the present disclosure. The client may be the client for managing an application provided in the foregoing embodiments of the present disclosure, and the cloud server may be the server interacting with the client for managing an application. As shown in FIG. 18, the client 1800 is included. The client 1800 includes a game player 1801. The game player 1801 may include an instruction receiver 1802 and a video receiver 1803. The instruction receiver 1802 may be configured to receive an operation instruction of the user in the game player (which may correspond to the related description of the application player in step 506), and send the operation instruction to an instruction parser 1811 of a cloud server 1804 in the form of a control flow. The video receiver 1803 may be configured to receive an application video stream from the cloud server 1804, decode the application video stream, and so on (which may correspond to the related description of the application player in step 506).

The cloud server 1804 includes a first client 1805. The first client 1805 includes a game rendering system 1806 and a game control system 1807. The game rendering system 1806 may render game screens. The game screens are acquired by using a video acquisition device 1808 in the cloud server 1804 (which may correspond to the related description of acquiring the game screens by the server in step 505). The server may encode the acquired screens by using a video encoder 1809 (which may correspond to the related description of encoding the acquired game screens by the server in step 505), perform quality control on an encoded video stream by using a quality controller 1810 (which may correspond to the related description of compressing the acquired game screens according to the quality parameter by the server in step 505), and finally, send the video stream to the video receiver 1803 of the client 1800. The game control system 1807 may receive an instruction parsed by the instruction parser 1811 and further control the game.

Figure 19:
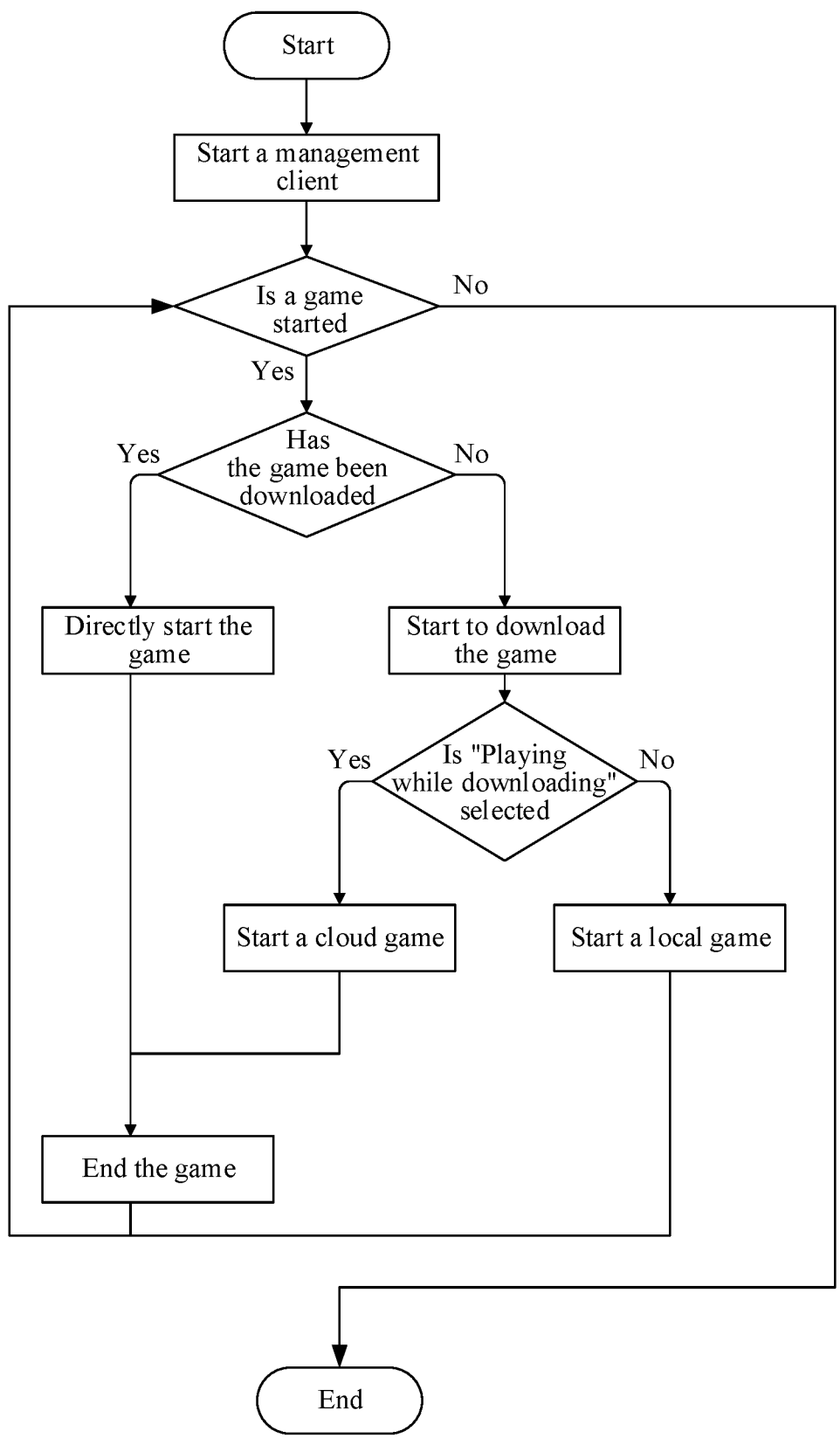
FIG. 19 is a schematic flowchart of running, by a terminal, a game while downloading a game application in response to a user according to an embodiment of the present disclosure.
Figure 20:
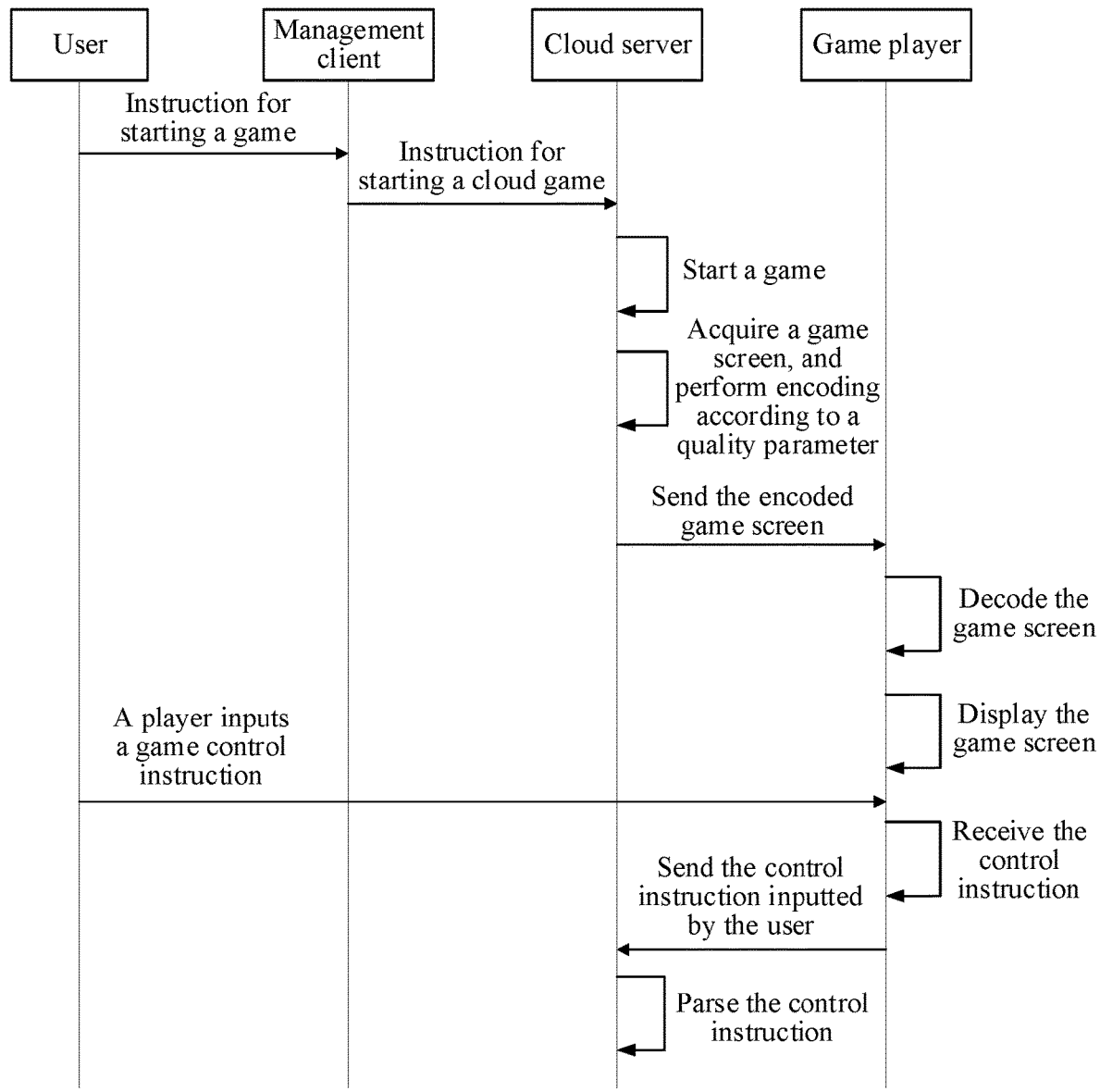
FIG. 20 is a schematic timing diagram of running, by a terminal, a game while downloading a game application in response to a user relating to FIG. 19 according to an embodiment of the present disclosure.

Using a game application as an example, FIG. 19 is a schematic flowchart of running, by a terminal, a game while downloading a game application in response to a user according to an embodiment of the present disclosure. FIG. 20 is a schematic timing diagram of running, by a terminal, a game while downloading a game application in response to a user relating to FIG. 19 according to an embodiment of the present disclosure. As shown in FIG. 19 and FIG. 20, a user starts a management client, the management client being a client capable of managing a game application (that is, equivalent to the client for managing an application in the foregoing embodiment). The user determines whether to start a game (corresponding to the description in step 401 or step 501), and when the user determines to start the game (corresponding to the description in step 402 or step 502), the terminal may determine whether the game has been downloaded (download a client of the game application). When the game has been downloaded in the terminal, the game is directly started, and when the game has not been downloaded in the terminal, the game starts to be downloaded, and the user is prompted whether to play while downloading (corresponding to the description in step 503). When the user chooses to play while downloading (corresponding to the description in step 504), the terminal starts a cloud game (corresponding to the descriptions in step 505 and step 506), and when the user chooses not to play while downloading, the terminal waits for the downloading of the target application to complete.

After the terminal starts the cloud game, as shown in FIG. 20, the user may send an instruction for starting a game to the management client (reference may be made to the related description of triggering the startup control in step 502), the management client sends the instruction for starting the cloud game to a cloud server (reference may be made to that the client sends the instruction for running the target application by using the first client to the server in step 504), the cloud server starts the game, loads game screens, acquires the generated game screens, and performs encoding according to a quality parameter (reference may be made to the description of obtaining the application video stream in step 505), and the cloud server sends the encoded game screens to a game player in the management client in the form of a video stream. The game player decodes the game screens and displays the game screens (reference may be made to the description of decoding the application video stream by the application player in step 506), the user may directly input a game control instruction in an interface displayed by the game player, the game player may receive the control instruction and send the control instruction inputted by the user to the cloud server in the form of a control flow (reference may be made to the description of sending by the application player in the control flow in step 506), and the cloud server may parse the received control instruction and control the game to run (reference may be made to the description of decoding the control flow by the server in step 506).

It is to be understood that, the steps in the embodiments of the present disclosure are not necessarily performed according to a sequence indicated by step numbers. Unless otherwise explicitly specified in the present disclosure, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

The following describes apparatus embodiments of the present disclosure, which can be used for executing the method embodiments of the present disclosure. For details not disclosed in the apparatus embodiments of the present disclosure, refer to the method embodiments of the present disclosure.

Figure 21:
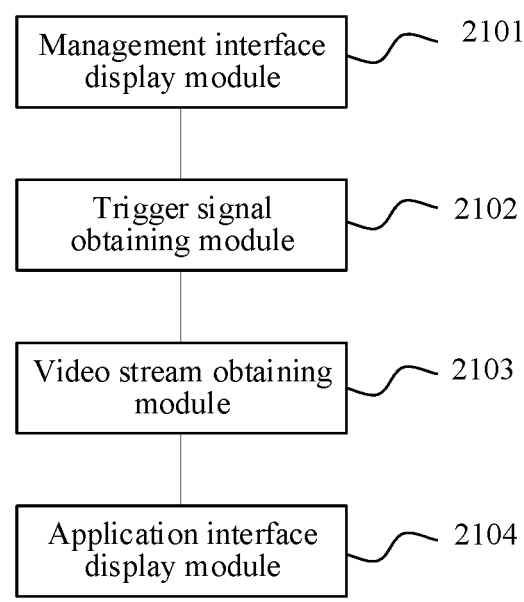
FIG. 21 is a structural block diagram of an apparatus for starting an application according to an exemplary embodiment of the present disclosure.

FIG. 21 is a structural block diagram of an apparatus for starting an application according to an exemplary embodiment of the present disclosure. The apparatus for starting an application is applicable to a terminal, to perform all or some steps performed by the terminal in the method shown in the embodiment corresponding to FIG. 4 or FIG. 5. The apparatus for starting an application may include the following modules:

a management interface display module 2101, configured to display an application startup management interface, the application startup management interface including at least one startup control of at least one application, each application corresponding to one startup control;

a trigger signal obtaining module 2102, configured to obtain a first trigger signal, the first trigger signal being a signal generated upon detecting a trigger operation on a startup control of a target application, the target application being any one of the at least one application;

a video stream obtaining module 2103, configured to obtain an application video stream when the terminal has not finished downloading a client of the target application, the application video stream being a video stream formed by application screens generated during running of a first client, the first client being a client of the target application run on a server; and an application interface display module 2104, configured to display a first application interface of the target application according to the application video stream.

In one embodiment, the apparatus further includes:

a first prompt interface display module, configured to display a first prompt interface before the video stream obtaining module 2103 obtains the application video stream requesting a user selection about whether to run the first client by using the server; and the video stream obtaining module, configured to perform the step of obtaining an application video stream when a second trigger signal is obtained, the second trigger signal being a signal generated upon detecting an operation of confirming to run the first client by using the server performed in the first prompt interface.

In one embodiment, the apparatus further includes:

an instruction obtaining module, configured to obtain a control instruction, the control instruction being an instruction corresponding to a control operation performed based on the first application interface; and an instruction transmitting module, configured to transmit the control instruction to the server.

In one embodiment, the apparatus further includes:

a client download module, configured to download the client of the target application in a process of displaying the first application interface of the target application according to the application video stream.

In one embodiment, the apparatus further includes:

a prompt information display module, configured to display prompt information corresponding to the startup control in the process in which the application interface display module 2104 displays the first application interface of the target application according to the application video stream, the prompt information being used for prompting that the first application interface is an application interface displayed in a process of downloading the client of the target application.

In one embodiment, the apparatus further includes:

an interface switching module, configured to switch the first application interface to a second application interface for display when downloading and installation of the client of the target application are finished in the process in which the application interface display module 2104 displays the first application interface of the target application according to the application video stream, the second application interface being an application interface displayed according to an application screen generated during running of a second client, the second client being a client of the target application installed on the terminal.

In one embodiment, the apparatus further includes:

a second prompt interface display module, configured to display a second prompt interface before the interface switching module switches the first application interface to the second application interface for display requesting a user selection about whether to run the client of the target application locally on the terminal; and the interface switching module, configured to perform the step of switching the first application interface to a second application interface for display when a third trigger signal is obtained, the third trigger signal being a signal generated upon detecting an operation of confirming to run the client of the target application locally performed in the second prompt interface.

In one embodiment, the apparatus further includes:

a switching control display module, configured to display a switching control corresponding to the first application interface when downloading and installation of the client of the target application are finished in the process of displaying the first application interface of the target application according to the application video stream before the interface switching module switches the first application interface to the second application interface for display; and the interface switching module, configured to switch the first application interface to the second application interface for display when a fourth trigger signal is obtained, the fourth trigger signal being a signal generated when a trigger operation performed on the switching control is received.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

When the apparatus provided in the foregoing embodiment performs the steps, only divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the apparatus and method embodiments of the method for starting an application provided in the foregoing embodiments belong to one conception. For the specific implementation process, reference may be made to the method embodiments, and details are not described herein again.

Figure 22:
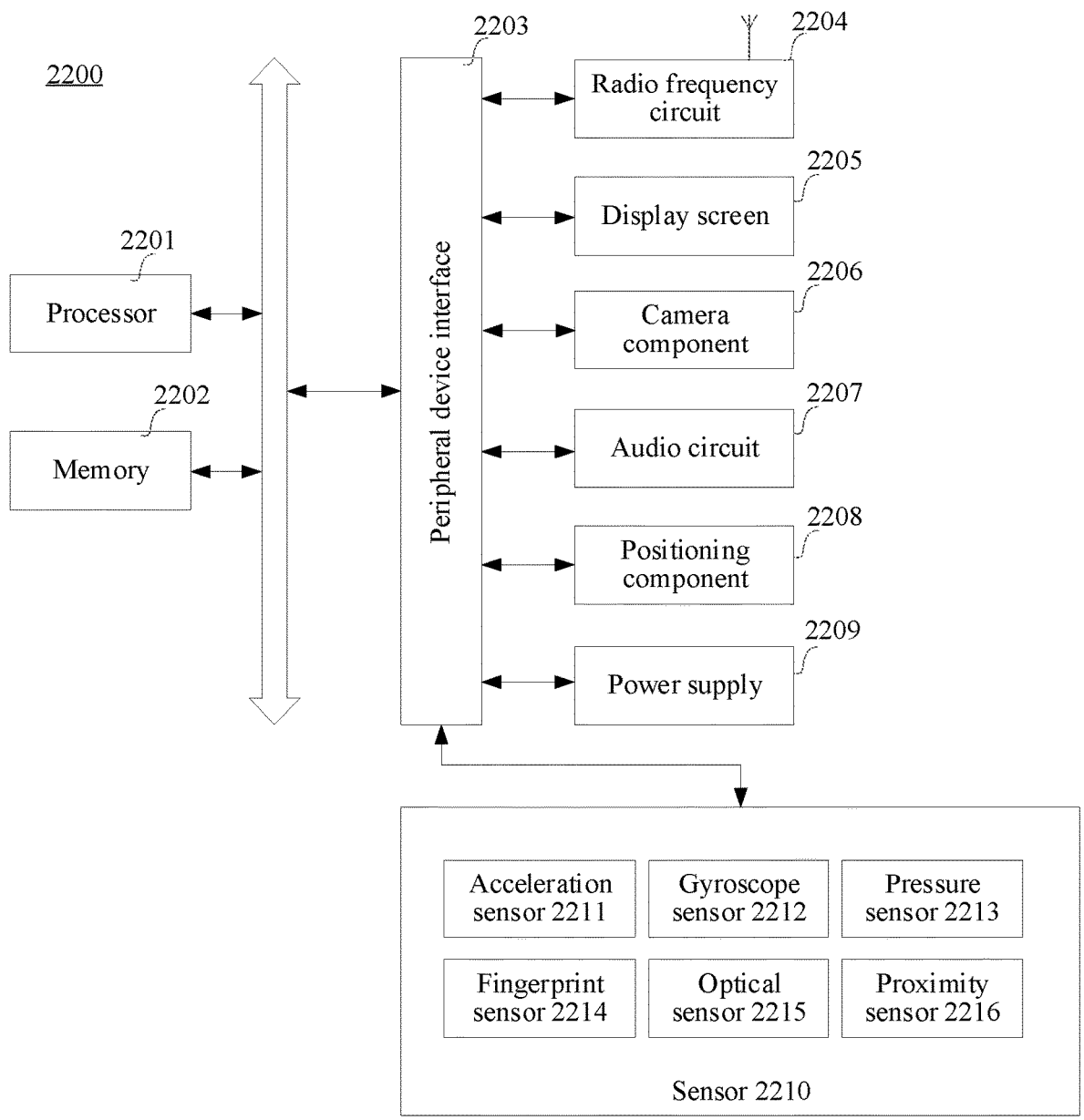
FIG. 22 is a structural block diagram of a computer device according to an exemplary embodiment of the present disclosure.

FIG. 22 is a structural block diagram of a computer device 2200 according to an exemplary embodiment of the present disclosure. The computer device 2200 may be a user terminal such as a smartphone, a tablet computer, a notebook computer, or a desktop computer. The computer device 2200 may also be referred to as another name such as user equipment, a portable terminal, a laptop terminal, or a desktop terminal.

Generally, the computer device 2200 includes a processor 2201 and a memory 2202.

The processor 2201 may include one or more processing cores, for example, a 4-core processor or an 8-core processor. The processor 2201 may be implemented in at least one hardware form of a digital signal processor (DSP), a field-programmable gate array (FPGA), and a programmable logic array (PLA). The processor 2201 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 2201 may be integrated with a graphics processing unit (GPU). The GPU is configured to render and draw content that needs to be displayed on a display screen. In some embodiments, the processor 2201 may further include an artificial intelligence (AI) processor. The AI processor is configured to process computing operations related to machine learning.

The memory 2202 may include one or more computer-readable storage media. The computer-readable storage medium may be non-transient. The memory 2202 may further include a high-speed random access memory and a nonvolatile memory, for example, one or more disk storage devices or flash storage devices. In some embodiments, the non-transient computer-readable storage medium in the memory 2202 is configured to store at least one instruction. The at least one instruction is executed by the processor 2201 to implement all or some steps performed by the user terminal in the method for starting an application provided in the method embodiments of the present disclosure.

In some embodiments, the computer device 2200 may further include a peripheral device interface 2203 and at least one peripheral device. The processor 2201, the memory 2202, and the peripheral device interface 2203 may be connected by using a bus or a signal cable. Each peripheral device may be connected to the peripheral device interface 2203 by using a bus, a signal cable, or a circuit board. Specifically, the peripheral device includes: at least one of a radio frequency (RF) circuit 2204, a touch display screen 2205, a camera component 2206, an audio circuit 2207, a positioning component 2208, and a power supply 2209.

The peripheral interface 2203 may be configured to connect the at least one peripheral related to input/output (I/O) to the processor 2201 and the memory 2202. In some embodiments, the processor 2201, the memory 2202 and the peripheral device interface 2203 are integrated on a same chip or circuit board. In some other embodiments, any one or two of the processor 2201, the memory 2202, and the peripheral device interface 2203 may be implemented on a single chip or circuit board. This is not limited in this embodiment.

The RF circuit 2204 is configured to receive and transmit an RF signal, also referred to as an electromagnetic signal. The RF circuit 2204 communicates with a communication network and other communication devices through the electromagnetic signal. The RF circuit 2204 converts an electric signal into an electromagnetic signal for transmission, or converts a received electromagnetic signal into an electric signal. In one embodiment, the RF circuit 2204 includes: an antenna system, an RF transceiver, one or more amplifiers, a tuner, an oscillator, a digital signal processor, a codec chip set, a subscriber identity module card, and the like. The RF circuit 2204 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF 2204 may further include a circuit related to NFC, which is not limited in the present disclosure.

The display screen 2205 is configured to display a user interface (UI). The UI may include a graph, text, an icon, a video, and any combination thereof. When the display screen 2205 is a touch display screen, the display screen 2205 is also capable of collecting a touch signal on or above a surface of the display screen 2205. The touch signal may be inputted to the processor 2201 as a control signal for processing. In this case, the display screen 2205 may be further configured to provide a virtual button and/or a virtual keyboard that are/is also referred to as a soft button and/or a soft keyboard. In some embodiments, there may be one display screen 2205, disposed on a front panel of the computer device 2200. In some other embodiments, there may be at least two display screens 2205, respectively disposed on different surfaces of the computer device 2200 or designed in a foldable shape. In still some other embodiments, the display screen 2205 may be a flexible display screen, disposed on a curved surface or a folded surface of the computer device 2200. Even, the display screen 2205 may be further set in a non-rectangular irregular pattern, namely, a special-shaped screen. The display screen 2205 may be prepared by using materials such as a liquid crystal display (LCD), an organic light-emitting diode (OLED), or the like.

The camera component 2206 is configured to collect images or videos. In one embodiment, the camera component 2206 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 2206 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 2207 may include a microphone and a speaker. The microphone is configured to collect sound waves of a user and an environment, and convert the sound waves into an electrical signal to input to the processor 2201 for processing, or input to the radio frequency circuit 2204 for implementing voice communication. For the purpose of stereo sound collection or noise reduction, there may be a plurality of microphones, respectively disposed at different parts of the computer device 2200. The microphone may further be an array microphone or an omni-directional collection type microphone. The speaker is configured to convert electrical signals from the processor 2201 or the RF circuit 2204 into sound waves. The speaker may be a common film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 2207 may also include an earphone jack.

The positioning component 2208 is configured to determine a current geographic location of the computer device 2200 through positioning, to implement navigation or a location based service (LBS). The positioning component 2208 may be a positioning component based on the Global Positioning System (GPS) of the United States, the BeiDou Navigation Satellite System (BDS) of China, the GLONASS System of Russia, or the GALILEO System of the European Union.

The power supply 2209 is configured to supply power to components in the computer device 2200. The power supply 2209 may be an alternating current, a direct current, a primary battery, or a rechargeable battery. When the power supply 2209 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the computer device 2200 may further include one or more sensors 2210. The one or more sensors 2210 include, but are not limited to: an acceleration sensor 2211, a gyroscope sensor 2212, a pressure sensor 2213, a fingerprint sensor 2214, an optical sensor 2215, and a proximity sensor 2216.

The acceleration sensor 2211 may detect accelerations on three coordinate axes of a coordinate system established by the computer device 2200. For example, the acceleration sensor 2211 may be configured to detect components of gravity acceleration on the three coordinate axes. The processor 2201 may control, according to a gravity acceleration signal collected by the acceleration sensor 2211, the touch display screen 2205 to display the user interface in a landscape view or a portrait view. The acceleration sensor 2211 may be further configured to collect motion data of a game or a user.

The gyroscope sensor 2212 may detect a body direction and a rotation angle of the computer device 2200. The gyroscope sensor 2212 may cooperate with the acceleration sensor 2211 to collect a 3D action by the user on the computer device 2200. The processor 2201 may implement the following functions according to the data collected by the gyroscope sensor 2212: motion sensing (such as changing the UI according to a tilt operation of the user), image stabilization during shooting, game control, and inertial navigation.

The pressure sensor 2213 may be disposed on a side frame of the computer device 2200 and/or a lower layer of the touch display screen 2205. When the pressure sensor 2213 is disposed on the side frame of the computer device 2200, a holding signal of the user on the computer device 2200 may be detected. The processor 2201 performs left and right hand recognition or a quick operation according to the holding signal collected by the pressure sensor 2213. When the pressure sensor 2213 is disposed on the low layer of the touch display screen 2205, the processor 2201 controls, according to a pressure operation of the user on the touch display screen 2205, an operable control on the UI. The operable control includes at least one of a button control, a scroll-bar control, an icon control, and a menu control.

The fingerprint sensor 2214 is configured to collect a user's fingerprint, and the processor 2201 identifies a user's identity according to the fingerprint collected by the fingerprint sensor 2214, or the fingerprint sensor 2214 identifies a user's identity according to the collected fingerprint. When identifying that the user's identity is a trusted identity, the processor 2201 authorizes the user to perform related sensitive operations. The sensitive operations include: unlocking a screen, viewing encrypted information, downloading software, paying, changing a setting, and the like. The fingerprint sensor 2214 may be disposed on a front face, a back face, or a side face of the computer device 2200. When a physical button or a vendor logo is disposed on the computer device 2200, the fingerprint sensor 2214 may be integrated together with the physical button or the vendor logo.

The optical sensor 2215 is configured to collect ambient light intensity. In an embodiment, the processor 2201 may control the display brightness of the touch display screen 2205 according to the ambient light intensity collected by the optical sensor 2215. Specifically, when the ambient light intensity is relatively high, the display brightness of the touch display screen 2205 is increased. When the ambient light intensity is relatively low, the display brightness of the touch display screen 2205 is decreased. In another embodiment, the processor 2201 may further dynamically adjust a camera parameter of the camera component 2206 according to the ambient light intensity collected by the optical sensor 2215.

The proximity sensor 2216, also referred to as a distance sensor, is usually disposed on the front panel of the computer device 2200. The proximity sensor 2216 is configured to collect a distance between a front face of the user and the front face of the computer device 2200. In an embodiment, when the proximity sensor 2216 detects that the distance between the front face of the user and the front face of the computer device 2200 is gradually decreased, the processor 2201 controls the touch display screen 2205 to switch from a screen-on state to a screen-off state. When the proximity sensor 2216 detects that the distance between the front face of the user and the front face of the computer device 2200 is gradually increased, the processor 2201 controls the touch display screen 2205 to switch from the screen-off state to the screen-on state.

A person skilled in the art may understand that the structure shown in FIG. 22 does not constitute any limitation on the computer device 2200, and the computer device may include more components or fewer components than those shown in the figure, or some components may be combined, or a different component deployment may be used.

Figure 23:
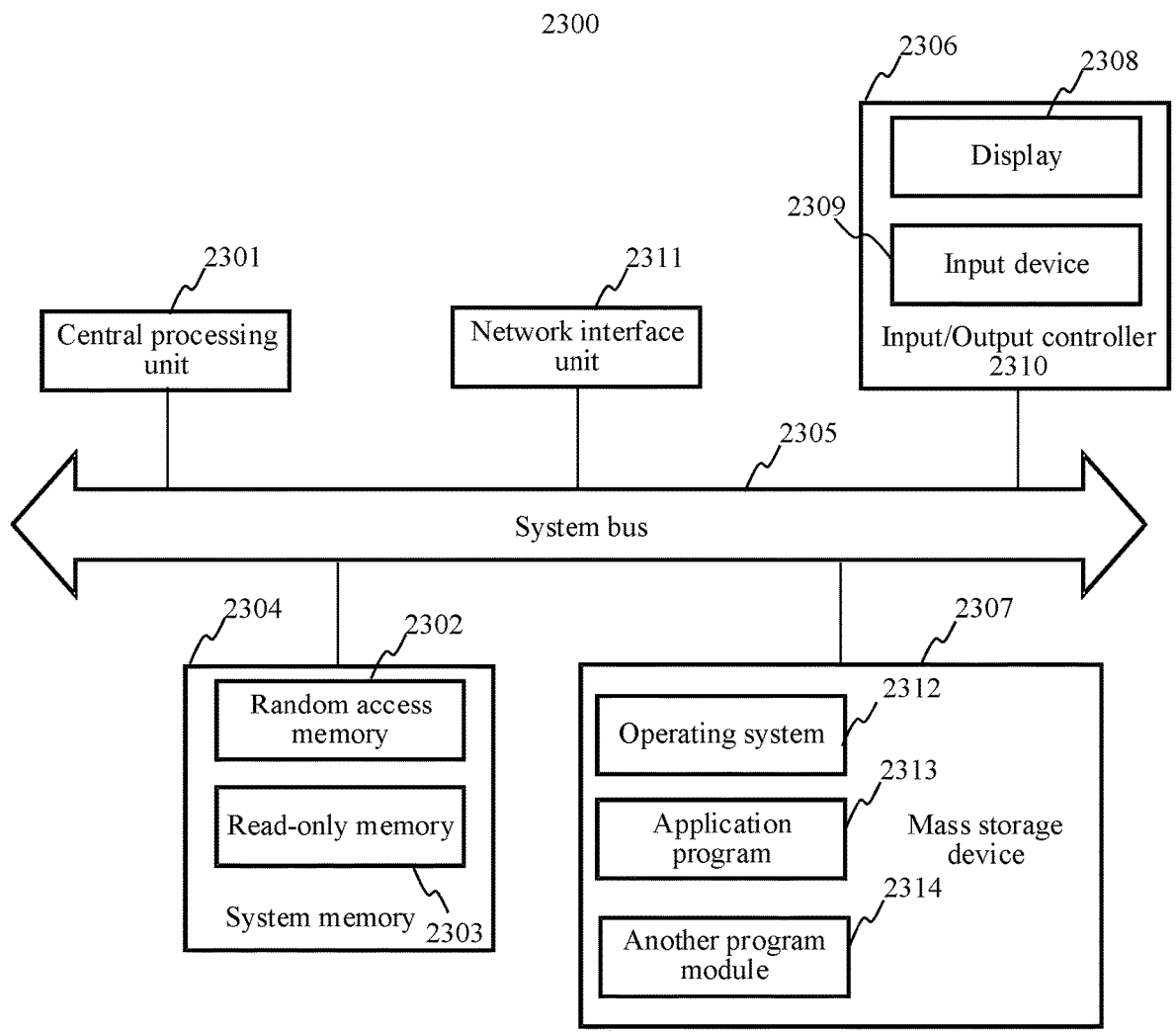
FIG. 23 is a schematic structural diagram of a computer device according to an exemplary embodiment of the present disclosure.

FIG. 23 is a schematic structural diagram of a computer device 2300 according to an exemplary embodiment of the present disclosure. The computer device 2300 includes a central processing unit (CPU) 2301, a system memory 2304 including a random access memory (RAM) 2302 and a read-only memory (ROM) 2303, and a system bus 2305 connecting the system memory 2304 and the CPU 2301. The computer device 2300 further includes a basic input/output (I/O) system 2306 configured to transmit information between components in a computer, and a mass storage device 2307 configured to store an operating system 2312, an application program 2313, and another program module 2314.

The basic I/O system 2306 includes a display 2308 configured to display information and an input device 2309 such as a mouse or a keyboard that is configured for information inputting by a user. The display 2308 and the input device 2309 are both connected to the CPU 2301 by using an I/O controller 2310 connected to the system bus 2305. The basic I/O system 2306 may further include the I/O controller 2310, to receive and process inputs from a plurality of other devices, such as the keyboard, the mouse, or an electronic stylus. Similarly, the input/output controller 2310 further provides an output to a display screen, a printer, or another type of output device.

The mass storage device 2307 is connected to the CPU 2301 by using a large-capacity storage controller (not shown) connected to the system bus 2305. The mass storage device 2307 and an associated computer-readable medium provide non-volatile storage for the computer device 2300. That is, the mass storage device 2307 may include a computer readable medium (not shown), such as a hard disk or a CD-ROM drive.

The computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 2304 and the mass storage device 2307 may be collectively referred to as a memory.

The computer device 2300 may be connected to the Internet or another network device by using a network interface unit 2311 connected to the system bus 2305.

The memory further includes one or more than one programs. The one or more than one programs are stored in the memory. The CPU 2301 executes the one or more than one programs to implement all or some steps performed by the server in the method provided by the embodiments of the present disclosure.

In an exemplary embodiment, a non-temporary computer-readable storage medium including an instruction, for example, a memory including a computer program (an instruction), is further provided, and the program (the instruction) may be executed by a processor of a computer device to complete all or some of steps of the methods shown in the embodiments of the present disclosure. For example, the non-temporary computer-readable storage medium may be a ROM, a random access memory (RAM), a CD-ROM, a magnetic tape, a floppy disk, an optical data storage device, or the like.

After considering the specification and practicing the present disclosure, a person skilled in the art may easily conceive of other implementations of the present disclosure. The present disclosure is intended to cover any variations, uses, or adaptive changes of the present disclosure. These variations, uses, or adaptive changes follow the general principles of the present disclosure and include common general knowledge or common technical means in the art, which are not disclosed in the present disclosure. The specification and the embodiments are considered as merely exemplary, and the scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A method for starting an application, performed by a terminal, the method comprising:
    displaying an application startup management interface comprising at least two startup controls of at least two applications, each application corresponding to one startup control;
    obtaining a first trigger signal, the first trigger signal being a signal generated upon detecting a trigger operation on a startup control of a target application, the target application being any one of the at least one application;
    obtaining, from a server, an application video stream when the terminal has not finished downloading a local client of the target application, the application video stream being a video stream formed by application screens generated during running of a first client, the first client being a remote client of the target application pre-deployed and run on the server, the first client being configured to execute same functions of the target application as the local client with no additional command logic added, and the server being a cloud server corresponding to an application platform that provides services to the at least two applications;
    displaying a first application interface of the target application according to the application video stream; and
    when downloading and installation of the local client of the target application are finished, switching from displaying the first application interface according to the application video stream to displaying a second application interface according to an application screen generated by running of the local client of the target application installed on the terminal.

2. The method according to claim 1, wherein before the obtaining an application video stream, the method further comprises:
    displaying a first prompt interface requesting a user selection about whether to run the first client by using the server; and
    the obtaining an application video stream comprises:
    obtaining the application video stream when a second trigger signal is obtained, the second trigger signal being a signal generated upon detecting an operation of confirming to run the first client by using the server, the operation of confirming to run the first client by using the server being performed in the first prompt interface.

3. The method according to claim 1, further comprising:
    obtaining a control instruction corresponding to a control operation performed based on the first application interface; and
    transmitting the control instruction to the server.

4. The method according to claim 1, further comprising:
    downloading the local client of the target application in a process of displaying the first application interface of the target application according to the application video stream.

5. The method according to claim 1, further comprising:
    displaying prompt information corresponding to the startup control in a process of displaying the first application interface of the target application according to the application video stream, the prompt information indicating that the first application interface is an application interface displayed in a process of downloading the local client of the target application.

6. The method according to claim 1, wherein before the switching the first application interface to a second application interface, the method further comprises:
    displaying a second prompt interface requesting a user selection about whether to run the local client of the target application locally on the terminal; and
    the switching the first application interface to a second application interface for comprises:
    switching the first application interface to the second application interface for display when a third trigger signal is obtained, the third trigger signal being a signal generated upon detecting an operation of confirming to run the client locally, the operation of confirming to run the client locally being performed in the second prompt interface.

7. The method according to claim 1, wherein before the switching the first application interface to a second application interface for display, the method further comprises:
    displaying a switching control corresponding to the first application interface when downloading and installation of the local client of the target application are finished in the process of displaying the first application interface of the target application according to the application video stream; and
    the switching the first application interface to a second application interface for display comprises:
    switching the first application interface to the second application interface for display when a fourth trigger signal is obtained, the fourth trigger signal being a signal generated upon detecting a trigger operation performed on the switching control.

8. The method according to claim 1, further comprising:
    in a process of displaying the first application interface of the target application according to the application video stream, performing the following:
    displaying a pause downloading control at a first state and first information, the first information indicating that the first application interface is displayed in a process of downloading the local client of the target application; and
    in response to the pause downloading control being triggered to switch from the first state, displaying the pause downloading control at a second state and second information, the second information indicating that the downloading of the local client of the target application is paused,
    wherein the pause downloading control and the first information are displayed within the application startup management interface and outside of the first application interface of the target application.

9. The method according to claim 1, wherein obtaining the application video stream comprises:
    receiving, from the server, the application video stream encoded by the server based on a quality parameter of high definition, wherein the quality parameter of high definition is adaptively adjusted based on a broadband performance of a current connection between the terminal and the server to maintain a downloading speed of downloading the local client.

10. The method according to claim 1, wherein the application video stream is encoded by the server based on a quality parameter of high definition, and the method further comprises:
    downloading, from the server, the local client of the target application at a downloading speed based on a broadband performance of a current connection between the terminal and the server, wherein the downloading speed is reduced by the server to maintain the quality parameter of high definition for encoding the video stream.

11. A computer device, comprising a memory and a processor, the memory storing computer-readable instructions, the computer-readable instructions, when executed by the processor, causing the processor to perform a plurality of operations comprising:
    displaying an application startup management interface comprising at least two startup controls of at least two applications, each application corresponding to one startup control;
    obtaining a first trigger signal, the first trigger signal being a signal generated upon detecting a trigger operation on a startup control of a target application, the target application being any one of the at least one application;
    obtaining, from a server, an application video stream when the terminal has not finished downloading a local client of the target application, the application video stream being a video stream formed by application screens generated during running of a first client, the first client being a remote client of the target application pre-deployed and run on the server, the first client being configured to execute same functions of the target application as the local client with no additional command logic added, and the server being a cloud server corresponding to an application platform that provides services to the at least two applications;
    displaying a first application interface of the target application according to the application video stream; and
    when downloading and installation of the local client of the target application are finished, switching from displaying the first application interface according to the application video stream to displaying a second application interface according to an application screen generated by running of the local client of the target application installed on the terminal.

12. The computer device according to claim 11, wherein before the obtaining an application video stream, the plurality of operations further comprises:
    displaying a first prompt interface requesting a user selection about whether to run the first client by using the server; and
    the obtaining an application video stream comprises:
    obtaining the application video stream when a second trigger signal is obtained, the second trigger signal being a signal generated upon detecting an operation of confirming to run the first client by using the server, the operation of confirming to run the first client by using the server being performed in the first prompt interface.

13. The computer device according to claim 11, wherein the plurality of operations further comprises:
    obtaining a control instruction corresponding to a control operation performed based on the first application interface; and transmitting the control instruction to the server.

14. The computer device according to claim 11, wherein the plurality of operations further comprises:
    downloading the local client of the target application in a process of displaying the first application interface of the target application according to the application video stream.

15. The computer device according to claim 11, wherein the plurality of operations further comprises:
    displaying prompt information corresponding to the startup control in a process of displaying the first application interface of the target application according to the application video stream, the prompt information indicating that the first application interface is an application interface displayed in a process of downloading the local client of the target application.

16. The computer device according to claim 11, wherein before the switching the first application interface to a second application interface for display, the plurality of operations further comprises:
    displaying a second prompt interface requesting a user selection about whether to run the local client of the target application locally on the computer device; and
    the switching the first application interface to a second application interface for display comprises:
    switching the first application interface to the second application interface for display when a third trigger signal is obtained, the third trigger signal being a signal generated upon detecting an operation of confirming to run the client locally, the operation of confirming to run the client locally being performed in the second prompt interface.

17. The computer device according to claim 11, wherein before the switching the first application interface to a second application interface for display, the plurality of operations further comprises:
    displaying a switching control corresponding to the first application interface when downloading and installation of the client of the target application are finished in the process of displaying the first application interface of the target application according to the application video stream; and
    the switching the first application interface to a second application interface for display comprises:
    switching the first application interface to the second application interface for display when a fourth trigger signal is obtained, the fourth trigger signal being a signal generated upon detecting a trigger operation performed on the switching control.

18. One or more non-transitory storage media storing computer-readable instructions, the computer-readable instructions, when executed by one or more processors of a terminal, causing the one or more processors to perform a plurality of operations comprising:
    displaying an application startup management interface comprising at least two startup controls of at least two applications, each application corresponding to one startup control;
    obtaining a first trigger signal, the first trigger signal being a signal generated upon detecting a trigger operation on a startup control of a target application, the target application being any one of the at least one application;
    obtaining, from a server, an application video stream when the terminal has not finished downloading a local client of the target application, the application video stream being a video stream formed by application screens generated during running of a first client, the first client being a remote client of the target application pre-deployed and run on the server, the first client being configured to execute same functions of the target application as the local client with no additional command logic added, and the server being a cloud server corresponding to an application platform that provides services to the at least two applications;

displaying a first application interface of the target application according to the application video stream; and when downloading and installation of the local client of the target application are finished, switching from displaying the first application interface according to the application video stream to displaying a second application interface according to an application screen generated by running of the local client of the target application installed on the terminal.

* * * * *